United States Patent
Weerasooriya et al.

(10) Patent No.: US 9,206,347 B2
(45) Date of Patent: Dec. 8, 2015

(54) QUATERNARY AMMONIUM SURFACTANTS

(71) Applicant: Board of Regents, The University of Texas System, Austin, TX (US)

(72) Inventors: Upali P. Weerasooriya, Austin, TX (US); Gary A. Pope, Cedar Park, TX (US); Kishore Mohanty, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 13/866,807

(22) Filed: Apr. 19, 2013

(65) Prior Publication Data

US 2013/0277276 A1  Oct. 24, 2013

Related U.S. Application Data

(60) Provisional application No. 61/635,796, filed on Apr. 19, 2012.

(51) Int. Cl.
*C09K 8/60* (2006.01)
*C09K 8/584* (2006.01)
*B01F 17/00* (2006.01)

(52) U.S. Cl.
CPC ............. *C09K 8/584* (2013.01); *B01F 17/0042* (2013.01)

(58) Field of Classification Search
USPC ........ 208/435; 562/567; 585/4; 507/240, 202
See application file for complete search history.

(56) References Cited

U.S. PATENT DOCUMENTS

| | | | |
|---|---|---|---|
| 3,811,504 A | 5/1974 | Flournoy et al. | |
| 3,811,505 A | 5/1974 | Flournoy et al. | |
| 3,811,507 A | 5/1974 | Flournoy et al. | |
| 3,890,239 A | 6/1975 | Dycus et al. | |
| 3,972,855 A | 8/1976 | Martinsson et al. | |
| 4,463,806 A | 8/1984 | Hurd | |
| 4,738,789 A | 4/1988 | Jones | |
| 5,311,943 A | 5/1994 | Wellington | |
| 5,494,593 A * | 2/1996 | Schleusener | 252/8.63 |
| 6,017,874 A | 1/2000 | Lappas et al. | |
| 6,022,843 A | 2/2000 | Shanks et al. | |
| 6,225,267 B1 | 5/2001 | Eckard et al. | |
| 7,629,299 B2 | 12/2009 | Berger et al. | |
| 2005/0199395 A1 | 9/2005 | Berger et al. | |

(Continued)

FOREIGN PATENT DOCUMENTS

EP    0182669 A1    11/1985
EP    0 182 669 A1    5/1986

(Continued)

OTHER PUBLICATIONS

International Search Report and Written Opinion mailed on Jul. 29, 2013 for International Patent Application No. PCT/US2013/037470, filed on Apr. 19, 2013, 9 pages.

(Continued)

*Primary Examiner* — Atnaf Admasu
(74) *Attorney, Agent, or Firm* — Meunier Carlin & Curfman LLC

(57) ABSTRACT

Provided herein, inter alia, are novel compositions and methods having application in the field of enhanced oil recovery. In particular, the quaternary ammonium compounds and mixtures thereof presented herein can be used, inter alia, for the recovery of a large range of crude oil compositions from challenging reservoirs.

17 Claims, 6 Drawing Sheets

(56) References Cited

U.S. PATENT DOCUMENTS

| | | |
|---|---|---|
| 2006/0185845 A1 | 8/2006 | Shpakoff et al. |
| 2007/0191633 A1 | 8/2007 | Berger et al. |
| 2009/0270281 A1 | 10/2009 | Steinbrenner et al. |
| 2010/0048432 A1 | 2/2010 | Costello et al. |
| 2010/0292110 A1 | 11/2010 | Pope et al. |
| 2010/0319920 A1 | 12/2010 | Pope et al. |
| 2011/0046024 A1 | 2/2011 | Campbell et al. |
| 2011/0048721 A1 | 3/2011 | Pope et al. |
| 2011/0059872 A1 | 3/2011 | Weerasooriya et al. |
| 2011/0059873 A1 | 3/2011 | Weerasooriya et al. |
| 2011/0071057 A1 | 3/2011 | Weerasooriya et al. |
| 2011/0100402 A1 | 5/2011 | Soane et al. |
| 2011/0190174 A1 | 8/2011 | Weerasooriya et al. |
| 2011/0190175 A1 | 8/2011 | Steinbrenner et al. |
| 2011/0201531 A1 | 8/2011 | Sharma et al. |

FOREIGN PATENT DOCUMENTS

| | | |
|---|---|---|
| WO | 01/59048 A1 | 8/2001 |
| WO | 02/04386 A2 | 1/2002 |
| WO | 02/102153 A2 | 12/2002 |
| WO | 2008/079855 A2 | 7/2008 |
| WO | 2012/027757 A1 | 3/2012 |

OTHER PUBLICATIONS

Third party Observation submitted on Jan. 20, 2014 for International Patent Application No. PCT/US2013/037470, filed on Apr. 19, 2013, 3 pages.

\* cited by examiner

QUATERNARY AMMONIUM SURFACTANTS

CROSS-REFERENCE TO RELATED APPLICATIONS

This application claims the benefit of U.S. Provisional Application No. 61/635,796 filed Apr. 19, 2012, which is hereby incorporated in its entirety and for all purposes.

BACKGROUND OF THE INVENTION

Enhanced Oil Recovery (abbreviated EOR) refers to techniques for increasing the amount of unrefined petroleum, or crude oil that may be extracted from an oil reservoir (e.g. an oil field). Using EOR, 40-60% of the reservoir's original oil can typically be extracted compared with only 20-40% using primary and secondary recovery (e.g. by water injection or natural gas injection). Enhanced oil recovery may also be referred to as improved oil recovery or tertiary recovery (as opposed to primary and secondary recovery).

Enhanced oil recovery may be achieved by a variety of methods including miscible gas injection (which includes carbon dioxide flooding), chemical injection (which includes polymer flooding, alkaline flooding and surfactant flooding), microbial injection, or thermal recovery (which includes cyclic steam, steam flooding, and fire flooding). The injection of various chemicals, usually as dilute aqueous solutions, has been used to improve oil recovery. Injection of alkaline or caustic solutions into reservoirs with oil that has organic acids naturally occurring in the oil will result in the production of soap that may lower the interfacial tension enough to increase production. Injection of a dilute solution of a water soluble polymer to increase the viscosity of the injected water can increase the amount of oil recovered in some formations. Dilute solutions of surfactants such as petroleum sulfonates may be injected to lower the interfacial tension or capillary pressure that impedes oil droplets from moving through a reservoir. Special formulations of oil, water and surfactant microemulsions have also proven useful. Application of these methods is usually limited by the cost of the chemicals and their adsorption and loss onto the rock of the oil containing formation.

Some unrefined petroleum contains carboxylic acids having, for example, $C_{11}$ to $C_{20}$ alkyl chains, including napthenic acid mixtures. The recovery of such "reactive" oils may be performed using alkali (e.g. NaOH or $Na_2CO_3$) in a surfactant composition. The alkali reacts with the acid in the reactive oil to form soap. These soaps serve as an additional source of surfactants enabling the use of much lower level of surfactants initially added to affect enhanced oil recovery (EOR). However, when the available water supply is hard, the added alkali causes precipitation of cations, such as $Ca^{+2}$ or $Mg^{+2}$. In order to prevent such precipitation an expensive chelant such as EDTA may be required in the surfactant composition. Alternatively, expensive water softening processes may be used.

The quaternary ammonium surfactant compositions provided herein address these and other needs in the art. Embodiments of the quaternary ammonium compounds represent a cost effective alternative to commonly used EOR surfactants (e.g. surfactants derived from Guerbet alcohols). The compounds described herein may improve the water wettability of the surface material in a well therefore increasing the efficiency of oil production. The compounds provided herein may further have a stabilizing effect on the foam and therefore the foam level. For instance, in the presence of a compound disclosed herein the stability of foam pumped into the well during the process of oil recovery may be increased when compared to the absence of the compound. In some embodiments, the compounds provided herein may decrease the water drainage from the surface of the bubble. In some embodiments, the level of foam pumped into the well may increase in the presence of the compound provided herein. In some embodiments, the compounds described herein may improve the effectiveness of co-surfactants (e.g. alkoxy carboxylates, alkoxy sulfates, sulfonate compounds such as ABS or IOS) to a surprising degree. In some embodiments, where the sulfonate compounds are combined with the compounds provided herein, the combination may be more stable and effective when compared to the stability and effectiveness of the sulfonate compounds in the absence of the compounds provided herein.

BRIEF SUMMARY OF THE INVENTION

In a first aspect, a compound having the formula

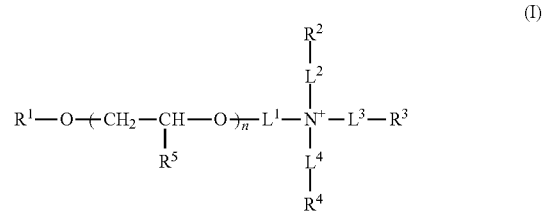

is provided.

In formula (I) $R^1$ is $R^{12}$-substituted or unsubstituted $C_8$-$C_{150}$ alkyl, $R^6$-substituted or unsubstituted heteroalkyl, $R^6$-substituted or unsubstituted aryl or $R^6$-substituted or unsubstituted cycloalkyl. $R^6$ is $R^7$-substituted or unsubstituted $C_1$-$C_{50}$ alkyl, $R^7$-substituted or unsubstituted heteroalkyl, $R^7$-substituted or unsubstituted aryl or $R^7$-substituted or unsubstituted cycloalkyl. $R^7$ is $R^8$-substituted or unsubstituted $C_1$-$C_{50}$ alkyl, $R^8$-substituted or unsubstituted heteroalkyl, $R^8$-substituted or unsubstituted aryl or $R^8$-substituted or unsubstituted cycloalkyl. $R^8$ is $R^9$-substituted or unsubstituted $C_1$-$C_{50}$ alkyl, $R^9$-substituted or unsubstituted heteroalkyl, $R^9$-substituted or unsubstituted aryl or $R^9$-substituted or unsubstituted cycloalkyl. $R^9$ is $R^{10}$-substituted or unsubstituted $C_1$-$C_{50}$ alkyl, $R^{10}$-substituted or unsubstituted heteroalkyl, $R^{10}$-substituted or unsubstituted aryl or $R^{10}$-substituted or unsubstituted cycloalkyl. $R^{10}$ is $R^{11}$-substituted or unsubstituted $C_1$-$C_{50}$ alkyl, $R^{11}$-substituted or unsubstituted heteroalkyl, $R^{11}$-substituted or unsubstituted aryl or $R^{11}$-substituted or unsubstituted cycloalkyl. $R^{11}$ is unsubstituted $C_1$-$C_{50}$ alkyl, unsubstituted heteroalkyl, unsubstituted aryl or unsubstituted cycloalkyl. $R^{12}$ is unsubstituted heteroalkyl, unsubstituted aryl, unsubstituted heteroaryl, unsubstituted heterocycloalkyl or unsubstituted cycloalkyl. $R^2$, $R^3$, and $R^4$ are independently unsubstituted alkyl, unsubstituted cycloalkyl, unsubstituted aryl, —O, —C(O)O$R^{13}$, or —S(O)$_m$$R^{13}$. $R^{13}$ is hydrogen, unsubstituted alkyl or unsubstituted cycloalkyl. m is 3 or 4. $R^5$ is independently hydrogen or unsubstituted $C_1$-$C_6$ alkyl. $L^1$, $L^2$, $L^3$, and $L^4$ are independently a bond, substituted or unsubstituted alkylene, substituted or unsubstituted heteroalkylene, substituted or unsubstituted cycloalkylene, or substituted or unsubstituted arylene, and n is an integer from 10 to 210.

DETAILED DESCRIPTION OF THE INVENTION

I. Definitions

Figure 1:
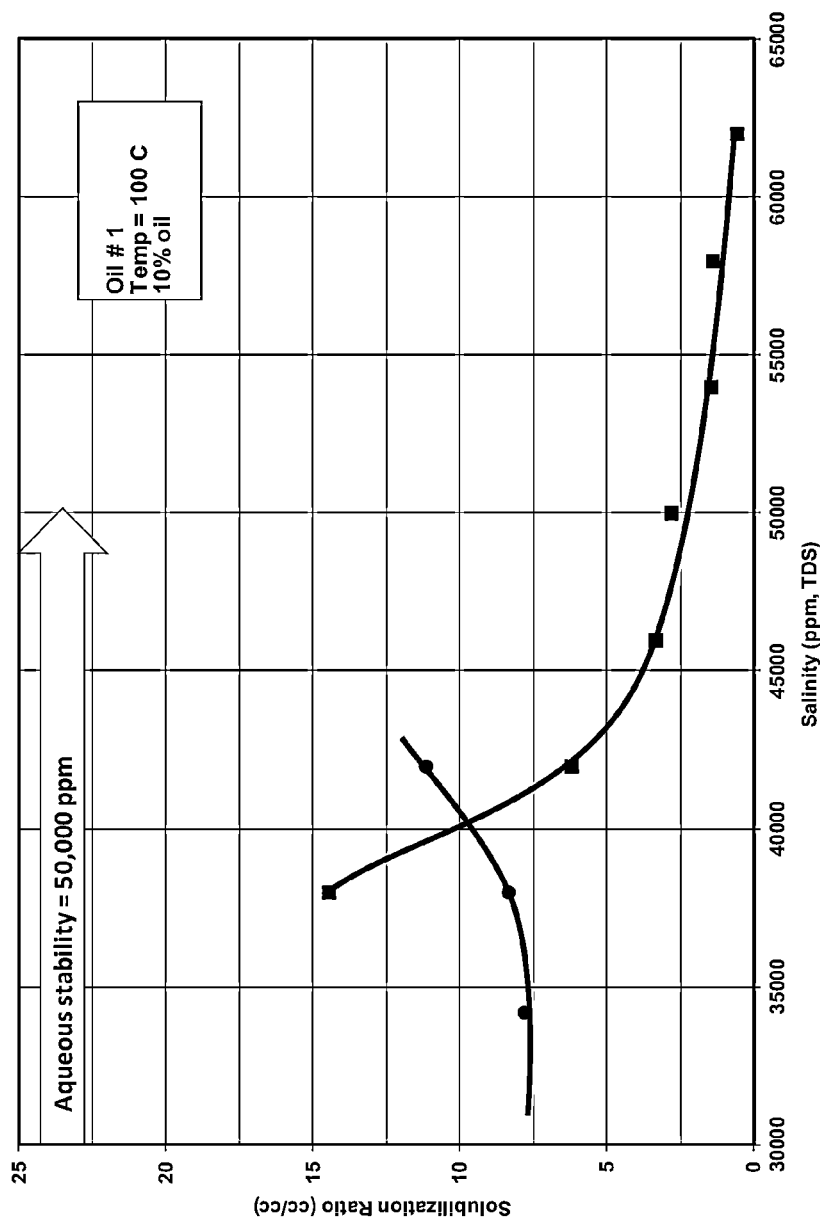
FIG. 1. Solubilization ratios using the surfactant formulation 0.4% C28-45PO-60EO Carboxylate, 0.4% C15-18 IOS, 0.2% Quaternary Ammonium Surfactant with Oil #1 (10%) at 100° C. The black arrow in the histogram pointing from left to right indicates the aqueous stability at 50,000 ppm (TDS).

The abbreviations used herein have their conventional meaning within the chemical and biological arts.

Where substituent groups are specified by their conventional chemical formulae, written from left to right, they equally encompass the chemically identical substituents that would result from writing the structure from right to left, e.g., $-CH_2O-$ is equivalent to $-OCH_2-$.

The term "alkyl," by itself or as part of another substituent, means, unless otherwise stated, a straight (i.e. unbranched) or branched chain which may be fully saturated, mono- or polyunsaturated and can include di- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. Alkyl groups which are limited to hydrocarbon groups are termed "homoalkyl". An alkoxy is an alkyl attached to the remainder of the molecule via an oxygen linker ($-O-$).

The term "alkylene" by itself or as part of another substituent means a divalent radical derived from an alkyl, as exemplified, but not limited, by $-CH_2CH_2CH_2CH_2-$, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The term "heteroalkyl," by itself or in combination with another term, means, unless otherwise stated, a stable straight or branched chain or combinations thereof, consisting of at least one carbon atom and at least one heteroatom selected from the group consisting of O, N, P, Si and S, and wherein the nitrogen and sulfur atoms may optionally be oxidized. and the nitrogen heteroatom may optionally be quaternized. The heteroatom(s) O, N, P and S and Si may be placed at any interior position of the heteroalkyl group or at the position at which the alkyl group is attached to the remainder of the molecule. Examples include, but are not limited to, $-CH_2-CH_2-O-CH_3$, $-CH_2-CH_2-NH-CH_3$, $-CH_2-CH_2-N(CH_3)-CH_3$, $-CH_2-S-CH_2-CH_3$, $-CH_2-CH_2-$, $-S(O)-CH_3$, $-CH_2-CH_2-S(O)_2-CH_3$, $-CH=CH-O-CH_3$, $-Si(CH_3)_3$, $-CH_2-CH=N-OCH_3$, $-CH=CH-N(CH_3)-CH_3$, $-O-CH_3$, $-O-CH_2-CH_3$, and $-CN$. Up to two heteroatoms may be consecutive, such as, for example, $-CH_2-NH-OCH_3$. Similarly, the term "heteroalkylene" by itself or as part of another substituent means a divalent radical derived from heteroalkyl, as exemplified, but not limited by, $-CH_2-CH_2-S-CH_2-CH_2-$ and $-CH_2-S-CH_2-CH_2-NH-CH_2-$. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula $-C(O)_2R'-$ represents both $-C(O)_2R'-$ and $-R'C(O)_2-$.

The terms "cycloalkyl" and "heterocycloalkyl," by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopropyl, cyclobutyl, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. A "cycloalkylene" and a "heterocycloalkylene," alone or as part of another substituent means a divalent radical derived from a cycloalkyl and heterocycloalkyl, respectively.

The term "aryl" means, unless otherwise stated, a polyunsaturated, aromatic, hydrocarbon substituent which can be a single ring or multiple rings (preferably from 1 to 3 rings) which are fused together (i.e. a fused ring aryl) or linked covalently. A fused ring aryl refers to multiple rings fused together wherein at least one of the fused rings is an aryl ring. The term "heteroaryl" refers to aryl groups (or rings) that contain from one to four heteroatoms selected from N, O, and S, wherein the nitrogen and sulfur atoms are optionally oxidized, and the nitrogen atom(s) are optionally quaternized. Thus, the term "heteroaryl" includes fused ring heteroaryl groups (i.e. multiple rings fused together wherein at least one of the fused rings is a heteroaromatic ring). A 5,6-fused ring heteroarylene refers to two rings fused together, wherein one ring has 5 members and the other ring has 6 members, and wherein at least one ring is a heteroaryl ring. Likewise, a 6,6-fused ring heteroarylene refers to two rings fused together, wherein one ring has 6 members and the other ring has 6 members, and wherein at least one ring is a heteroaryl ring. And a 6,5-fused ring heteroarylene refers to two rings fused together, wherein one ring has 6 members and the other ring has 5 members, and wherein at least one ring is a heteroaryl ring. A heteroaryl group can be attached to the remainder of the molecule through a carbon or heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below. An "arylene" and a "heteroarylene," alone or as part of another substituent means a divalent radical derived from an aryl and heteroaryl, respectively.

The term "oxo" as used herein means an oxygen that is double bonded to a carbon atom.

Where a substituent of a compound provided herein is "R-substituted" (e.g. $R^7$-substituted), it is meant that the substituent is substituted with one or more of the named R groups (e.g. $R^7$) as appropriate. In some embodiments, the substituent is substituted with only one of the named R groups.

The symbol "〜" denotes the point of attachment of a chemical moiety to the remainder of a molecule or chemical formula.

Each R-group as provided in the formulae provided herein can appear more than once. Where an R-group appears more than once each R group can be optionally different.

The term "contacting" as used herein, refers to materials or compounds being sufficiently close in proximity to react or interact. For example, in methods of contacting a hydrocarbon material bearing formation and/or a well bore, the term "contacting" includes placing an aqueous composition (e. g. chemical, surfactant or polymer) within a hydrocarbon material bearing formation using any suitable manner known in the art (e.g., pumping, injecting, pouring, releasing, displacing, spotting or circulating the chemical into a well, well bore or hydrocarbon bearing formation).

The terms "unrefined petroleum" and "crude oil" are used interchangeably and in keeping with the plain ordinary usage of those terms. "Unrefined petroleum" and "crude oil" may be found in a variety of petroleum reservoirs (also referred to herein as a "reservoir," "oil field deposit" "deposit" and the like) and in a variety of forms including oleaginous materials, oil shales (i.e. organic-rich fine-grained sedimentary rock), tar sands, light oil deposits, heavy oil deposits, and the like. "Crude oils" or "unrefined petroleums" generally refer to a mixture of naturally occurring hydrocarbons that may be refined into diesel, gasoline, heating oil, jet fuel, kerosene, and other products called fuels or petrochemicals. Crude oils or unrefined petroleums are named according to their contents and origins, and are classified according to their per unit weight (specific gravity). Heavier crudes generally yield more heat upon burning, but have lower gravity as defined by the American Petroleum Institute (API) and market price in comparison to light (or sweet) crude oils. Crude oil may also be characterized by its Equivalent Alkane Carbon Number (EACN).

Crude oils vary widely in appearance and viscosity from field to field. They range in color, odor, and in the properties they contain. While all crude oils are mostly hydrocarbons, the differences in properties, especially the variation in molecular structure, determine whether a crude oil is more or less easy to produce, pipeline, and refine. The variations may even influence its suitability for certain products and the quality of those products. Crude oils are roughly classified into three groups, according to the nature of the hydrocarbons they contain. (i) Paraffin based crude oils contain higher molecular weight paraffins, which are solid at room temperature, but little or no asphaltic (bituminous) matter. They can produce high-grade lubricating oils. (ii) Asphaltene based crude oils contain large proportions of asphaltic matter, and little or no paraffin. Some are predominantly naphthenes and so yield lubricating oils that are sensitive to temperature changes than the paraffin-based crudes. (iii) Mixed based crude oils contain both paraffin and naphthenes, as well as aromatic hydrocarbons. Most crude oils fit this latter category.

"Reactive" crude oil as referred to herein is crude oil containing natural organic acidic components (also referred to herein as unrefined petroleum acid) or their precursors such as esters or lactones. These reactive crude oils can generate soaps (carboxylates) when reacted with alkali. More terms used interchangeably for crude oil throughout this disclosure are hydrocarbon material or active petroleum material. An "oil bank" or "oil cut" as referred to herein, is the crude oil that does not contain the injected chemicals and is pushed by the injected fluid during an enhanced oil recovery process. A "nonactive oil," as used herein, refers to an oil that is not substantially reactive or crude oil not containing significant amounts of natural organic acidic components or their precursors such as esters or lactones such that significant amounts of soaps are generated when reacted with alkali. A nonactive oil as referred to herein includes oils having an acid number of less than 0.5 mg KOH/g of oil.

"Unrefined petroleum acids" as referred to herein are carboxylic acids contained in active petroleum material (reactive crude oil). The unrefined petroleum acids contain $C_{11}$ to $C_{20}$ alkyl chains, including napthenic acid mixtures. The recovery of such "reactive" oils may be performed using alkali (e.g. NaOH or $Na_2CO_3$) in a surfactant composition. The alkali reacts with the acid in the reactive oil to form soap in situ. These in situ generated soaps serve as a source of surfactants minimizing the levels of added surfactants, thus enabling efficient oil recovery from the reservoir.

The term "polymer" refers to a molecule having a structure that essentially includes the multiple repetitions of units derived, actually or conceptually, from molecules of low relative molecular mass. In some embodiments, the polymer is an oligomer.

The term "bonded" refers to having at least one of covalent bonding, hydrogen bonding, ionic bonding, Van Der Waals interactions, pi interactions, London forces or electrostatic interactions.

The term "productivity" as applied to a petroleum or oil well refers to the capacity of a well to produce hydrocarbons (e.g. unrefined petroleum); that is, the ratio of the hydrocarbon flow rate to the pressure drop, where the pressure drop is the difference between the average reservoir pressure and the flowing bottom hole well pressure (i.e., flow per unit of driving force).

The term "oil solubilization ratio" is defined as the volume of oil solubilized divided by the volume of surfactant in microemulsion. All the surfactant is presumed to be in the microemulsion phase. The oil solubilization ratio is applied for Winsor type I and type III behavior. The volume of oil solubilized is found by reading the change between initial aqueous level and excess oil (top) interface level. The oil solubilization ratio is calculated as follows:

$$\sigma_o = \frac{V_o}{V_s},$$

wherein
$\sigma_o$=oil solubilization ratio;
$V_o$=volume of oil solubilized;
$V_s$=volume of surfactant.

The term "water solubilization ratio" is defined as the volume of water solubilized divided by the volume of surfactant in microemulsion. All the surfactant is presumed to be in the microemulsion phase. The water solubilization ratio is applied for Winsor type III and type II behavior. The volume of water solubilized is found by reading the change between initial aqueous level and excess water (bottom) interface level. The water solubilization parameter is calculated as follows:

$$\sigma_w = \frac{V_w}{V_s},$$

wherein
$\sigma_w$=water solubilization ratio;
$V_w$=volume of water solubilized.

The optimum solubilization ratio occurs where the oil and water solubilization ratios are equal. The coarse nature of phase behavior screening often does not include a data point at optimum, so the solubilization ratio curves are drawn for the oil and water solubilization ratio data and the intersection of these two curves is defined as the optimum. The following is true for the optimum solubilization ratio:

$\sigma_O = \sigma_W = \sigma^*$;

$\sigma^*$=optimum solubilization ratio.

The term "solubility" or "solubilization" in general refers to the property of a solute, which can be a solid, liquid or gas, to dissolve in a solid, liquid or gaseous solvent thereby forming a homogenous solution of the solute in the solvent. Solubility occurs under dynamic equilibrium, which means that solubility results from the simultaneous and opposing processes of dissolution and phase joining (e.g. precipitation of solids). The solubility equilibrium occurs when the two processes proceed at a constant rate. The solubility of a given solute in a given solvent typically depends on temperature. For many solids dissolved in liquid water, the solubility increases with temperature. In liquid water at high temperatures, the solubility of ionic solutes tends to decrease due to the change of properties and structure of liquid water. In more particular, solubility and solubilization as referred to herein is the property of oil to dissolve in water and vice versa.

"Viscosity" refers to a fluid's internal resistance to flow or being deformed by shear or tensile stress. In other words, viscosity may be defined as thickness or internal friction of a liquid. Thus, water is "thin", having a lower viscosity, while oil is "thick", having a higher viscosity. More generally, the less viscous a fluid is, the greater its ease of fluidity.

The term "salinity" as used herein, refers to concentration of salt dissolved in a aqueous phases. Examples for such salts are without limitation, sodium chloride, magnesium and calcium sulfates, and bicarbonates. In more particular, the term salinity as it pertains to the present invention refers to the concentration of salts in brine and surfactant solutions.

The term "aqueous solution or aqueous formulation" refers to a solution in which the solvent is water. The term "emulsion, emulsion solution or emulsion formulation" refers to a mixture of two or more liquids which are normally immiscible. A non-limiting example for an emulsion is a mixtures of oil and water.

A "co-solvent" refers to a compound having the ability to increase the solubility of a solute (e.g. a surfactant as disclosed herein) in the presence of an unrefined petroleum acid. In some embodiments, the co-solvents provided herein have a hydrophobic portion (alkyl or aryl chain), a hydrophilic portion (e.g. an alcohol) and optionally an alkoxy portion. Co-solvents as provided herein include alcohols (e.g. $C_1$-$C_6$ alcohols, $C_1$-$C_6$ diols), alkoxy alcohols (e.g. $C_1$-$C_6$ alkoxy alcohols, $C_1$-$C_6$ alkoxy diols, and phenyl alkoxy alcohols), glycol ether, glycol and glycerol. The term "alcohol" is used according to its ordinary meaning and refers to an organic compound containing an —OH groups attached to a carbon atom. The term "diol" is used according to its ordinary meaning and refers to an organic compound containing two —OH groups attached to two different carbon atoms. The term "alkoxy alcohol" is used according to its ordinary meaning and refers to an organic compound containing an alkoxy linker attached to a —OH group A "microemulsion" as referred to herein is a thermodynamically stable mixture of oil, water, and a stabilizing agents such as a surfactant or a co-solvent that may also include additional components such as alkali agents, polymers (e.g. water-soluble polymers) and a salt. In contrast, a "macroemulsion" as referred to herein is a thermodynamically unstable mixture of oil and water that may also include additional components. An "emulsion" as referred to herein may be a microemulsion or a macroemulsion.

II. Compositions

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not limit the scope of the invention.

Provided herein, inter alia, are large hydrophobe quaternary ammonium compounds and methods of using the same for a variety of applications including enhanced oil recovery. The compounds provided herein may be used with broad oil concentrations, at a wide range of salinities, at high reservoir temperatures and over a broad pH range. The quaternary ammonium compounds of the present invention represent a cost effective alternative to commonly used EOR surfactants (e.g. surfactants derived from Guerbet alcohols). The compounds described herein may improve the water wettability of the surface material in a well. The compounds provided herein may further have an effect on foam stability and foam level. For instance, in the presence of a compound disclosed herein the stability of foam pumped into the well during the process of oil recovery is increased when compared to the absence of the compound. Further, the level of foam pumped into the well may increase in the presence of the compound provided herein. The compounds described herein may also significantly improve the effectiveness of co-surfactants (e.g. sulfonate compounds such as ABS or IOS) to a surprising degree. Where sulfonate compounds are combined with the compounds provided herein, the combination may be more stable and effective when compared to the stability and effectiveness of the sulfonate compounds in the absence of the compounds provided herein (e.g. a compound of formula (I), (II), or (III)). Further, the compounds improve the water wettability of the solid material (e.g. rock, regolith) in contact with unrefined petroleum in a well.

In a first aspect, a compound having the formula:

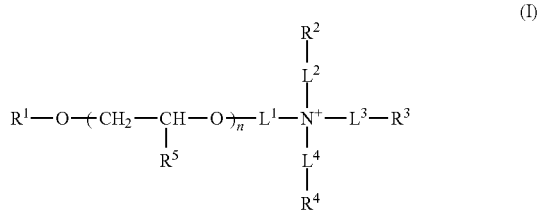

(I)

is provided.

In formula (I) $R^1$ is $R^{12}$-substituted or unsubstituted $C_8$-$C_{150}$ alkyl, $R^6$-substituted or unsubstituted heteroalkyl, $R^6$-substituted or unsubstituted aryl or $R^6$-substituted or unsubstituted cycloalkyl. $R^6$ is $R^7$-substituted or unsubstituted $C_1$-$C_{50}$ alkyl, $R^7$-substituted or unsubstituted heteroalkyl, $R^7$-substituted or unsubstituted aryl or $R^7$-substituted or unsubstituted cycloalkyl. $R^7$ is $R^8$-substituted or unsubstituted $C_1$-$C_{50}$ alkyl, $R^8$-substituted or unsubstituted heteroalkyl, $R^8$-substituted or unsubstituted aryl or $R^8$-substituted or unsubstituted cycloalkyl. $R^8$ is $R^9$-substituted or unsubstituted $C_1$-$C_{50}$ alkyl, $R^9$-substituted or unsubstituted heteroalkyl, $R^9$-substituted or unsubstituted aryl or $R^9$-substituted or unsubstituted cycloalkyl. $R^9$ is $R^{10}$-substituted or unsubstituted $C_1$-$C_{50}$ alkyl, $R^{10}$-substituted or unsubstituted heteroalkyl, $R^{10}$-substituted or unsubstituted heteroalkyl, $R^{10}$-substituted or unsubstituted aryl or $R^{10}$-substituted or unsubstituted cycloalkyl. $R^{10}$ is $R^{11}$-substituted or unsubstituted $C_1$-$C_{50}$ alkyl, $R^{11}$-substituted or unsubstituted heteroalkyl, $R^{11}$-substituted or unsubstituted aryl or $R^{11}$-substituted or unsubstituted cycloalkyl. $R^{11}$ is unsubstituted $C_1$-$C_{50}$ alkyl, unsubstituted heteroalkyl, unsubstituted aryl or unsubstituted cycloalkyl. $R^{12}$ is unsubstituted heteroalkyl, unsubstituted aryl or unsubstituted cycloalkyl. $R^2$, $R^3$, and $R^4$ are independently unsubstituted alkyl, unsubstituted cycloalkyl, unsubstituted aryl, $-OR^{13}$, $-C(O)OR^{13}$, or $-S(O)_m R^{13}$. $R^{13}$ is hydrogen, unsubstituted alkyl or unsubstituted cycloalkyl. m is 3 or 4. $R^5$ is independently hydrogen or unsubstituted $C_1$-$C_6$ alkyl. $L^1$, $L^2$, $L^3$, and $L^4$ are independently a bond, substituted or unsubstituted alkylene, substituted or unsubstituted heteroalkylene, substituted or unsubstituted cycloalkylene, substituted or unsubstituted hetercycloalkylene, substituted or unsubstituted heteroarylene or substituted or unsubstituted arylene, and n is an integer from 10 to 210. In formula (I) each of $R^5$, $R^6$, $R^7$, $R^8$, $R^9$, $R^{10}$, $R^{11}$, $R^{12}$, and $R^{13}$, can appear more than once and can be optionally different. For example, in some embodiments where n is 4, $R^5$ appears four times and can be optionally different. In other embodiments, where n is 6, $R^5$ appears six times and can be optionally different.

In other embodiments, the symbol n is an integer from 10 to 210. In other embodiments, the symbol n is an integer from 15 to 210. In other embodiments, the symbol n is an integer from 20 to 210. In other embodiments, the symbol n is an integer from 25 to 210. In other embodiments, the symbol n is an integer from 30 to 210. In other embodiments, the symbol n is an integer from 35 to 210. In other embodiments, the symbol n is an integer from 40 to 210. In other embodiments, the symbol n is an integer from 45 to 210. In other embodiments, the symbol n is an integer from 50 to 210. In other embodiments, the symbol n is an integer from 55 to 210. In other embodiments, the symbol n is an integer from 60 to 210. In other embodiments, the symbol n is an integer from 65 to 210. In other embodiments, the symbol n is an integer from 70 to 210. In other embodiments, the symbol n is an integer from 10 to 100. In other embodiments, the symbol n is an integer from 20 to 100. In other embodiments, the symbol n is an integer from 25 to 100. In other embodiments, the symbol n is an integer from 30 to 100. In other embodiments, the symbol n is an integer from 35 to 100. In other embodiments, the symbol n is an integer from 40 to 100. In other embodiments, the symbol n is an integer from 45 to 100. In other embodiments, the symbol n is an integer from 50 to 100. In other embodiments, the symbol n is an integer from 55 to 100. In other embodiments, the symbol n is an integer from 60 to 100. In other embodiments, the symbol n is an integer from 65 to 100. In other embodiments, the symbol n is an integer from 70 to 100. In some embodiments, n is 45 to 110. In some further embodiments, n is 50 to 105. In some other further embodiments, n is 50. In some further other embodiments, n is 95. In some related embodiments, $R^1$ is $R^{12}$-substituted or unsubstituted $C_{20}$-$C_{150}$ alkyl. In other related embodiments, $R^1$ is $R^{12}$-substituted or unsubstituted $C_{22}$-$C_{150}$ alkyl. In other related embodiments, $R^1$ is $R^{12}$-substituted or unsubstituted $C_{24}$-$C_{150}$ alkyl. In other related embodiments, $R^1$ is $R^{12}$-substituted or unsubstituted $C_{20}$-$C_{50}$ alkyl. In other related embodiments, $R^1$ is $R^{12}$-substituted or unsubstituted $C_{22}$-$C_{50}$ alkyl. In other related embodiments, $R^1$ is $R^{12}$-substituted or unsubstituted $C_{24}$-$C_{50}$ alkyl.

In some embodiments, $R^1$ is branched unsubstituted $C_{10}$-$C_{50}$ alkyl, branched unsubstituted $C_{10}$-$C_{50}$ heteroalkyl, $(C_6H_5-CH_2CH_2)_3C_6H_2$-, $(C_6H_5-CH_2CH_2)_2C_6H_3$—, $(C_6H_5-CH_2CH_2)_1C_6H_4$—, or $R^6$-substituted or unsubstituted naphthyl. In some embodiments, the naphthyl is a mono-, di-, or tri-alkyl naphthyl or any combination thereof. In some related embodiments, the alkyl is a saturated alkyl. In other related embodiments, n is as defined in an embodiment above (e.g. n is at least 25; or at least 35, e.g. 35 to 105).

$R^1$ may be substituted or unsubstituted alkyl. In some embodiments, $R^1$ is $R^{12}$-substituted or unsubstituted $C_{10}$-$C_{150}$ alkyl. In some embodiments, $R^1$ is $R^{12}$-substituted or unsubstituted $C_{12}$-$C_{150}$ alkyl. In some embodiments, $R^1$ is $R^{12}$-substituted or unsubstituted $C_{14}$-$C_{150}$ alkyl. In some embodiments, $R^1$ is $R^{12}$-substituted or unsubstituted $C_{16}$-$C_{150}$ alkyl. In some embodiments, $R^1$ is $R^{12}$-substituted or unsubstituted $C_{18}$-$C_{150}$ alkyl. In some embodiments, $R^1$ is $R^{12}$-substituted or unsubstituted $C_{20}$-$C_{150}$ alkyl. In some embodiments, $R^1$ is $R^{12}$-substituted or unsubstituted $C_{22}$-$C_{150}$ alkyl. In some embodiments, $R^1$ is $R^{12}$-substituted or unsubstituted $C_{24}$-$C_{150}$ alkyl. In some embodiments, $R^1$ is $R^{12}$-substituted or unsubstituted $C_{10}$-$C_{100}$ alkyl. In some embodiments, $R^1$ is $R^{12}$-substituted or unsubstituted $C_{12}$-$C_{100}$ alkyl. In some embodiments, $R^1$ is $R^{12}$-substituted or unsubstituted $C_{14}$-$C_{100}$ alkyl. In some embodiments, $R^1$ is $R^{12}$-substituted or unsubstituted $C_{16}$-$C_{100}$ alkyl. In some embodiments, $R^1$ is $R^{12}$-substituted or unsubstituted $C_{18}$-$C_{100}$ alkyl. In some embodiments, $R^1$ is $R^{12}$-substituted or unsubstituted $C_{20}$-$C_{100}$ alkyl. In some embodiments, $R^1$ is $R^{12}$-substituted or unsubstituted $C_{22}$-$C_{100}$ alkyl. In some embodiments, $R^1$ is $R^{12}$-substituted or unsubstituted $C_{24}$-$C_{100}$ alkyl. In some embodiments, $R^1$ is $R^{12}$-substituted or unsubstituted $C_{10}$-$C_{50}$ alkyl. In some embodiments, $R^1$ is $R^{12}$-substituted or unsubstituted $C_{12}$-$C_{50}$ alkyl. In some embodiments, $R^1$ is $R^{12}$-substituted or unsubstituted $C_{14}$-$C_{50}$ alkyl. In some embodiments, $R^1$ is $R^{12}$-substituted or unsubstituted $C_{16}$-$C_{50}$ alkyl. In some embodiments, $R^1$ is $R^{12}$-substituted or unsubstituted $C_{18}$-$C_{50}$ alkyl. In some embodiments, $R^1$ is $R^{12}$-substituted or unsubstituted $C_{20}$-$C_{50}$ alkyl. In some embodiments, $R^1$ is $R^{12}$-substituted or unsubstituted $C_{22}$-$C_{50}$ alkyl. In some embodiments, $R^1$ is $R^{12}$-substituted or unsubstituted $C_{24}$-$C_{50}$ alkyl. In some related embodiments, the alkyl is a saturated alkyl. In other related embodiments, n is as defined in an embodiment above (e.g. n is at least 25; or at least 35, e.g. 35 to 100).

In some embodiments, $R^1$ is $R^{12}$-substituted or unsubstituted $C_{10}$-$C_{40}$ alkyl. In some embodiments, $R^1$ is $R^{12}$-substituted or unsubstituted $C_{12}$-$C_{40}$ alkyl. In some embodiments, $R^1$ is $R^{12}$-substituted or unsubstituted $C_{14}$-$C_{40}$ alkyl. In some embodiments, $R^1$ is $R^{12}$-substituted or unsubstituted $C_{16}$-$C_{40}$ alkyl. In some embodiments, $R^1$ is $R^{12}$-substituted or unsubstituted $C_{18}$-$C_{40}$ alkyl. In some embodiments, $R^1$ is $R^{12}$-substituted or unsubstituted $C_{20}$-$C_{40}$ alkyl. In some embodiments, $R^1$ is $R^{12}$-substituted or unsubstituted $C_{22}$-$C_{40}$ alkyl. In some embodiments, $R^1$ is $R^{12}$-substituted or unsubstituted $C_{24}$-$C_{40}$ alkyl. In some related embodiments, the alkyl is a saturated alkyl. In other related embodiments, n is as defined in an embodiment above (e.g. n is at least 25; or at least 35, e.g. 35 to 100).

In some embodiments, $R^1$ is $R^{12}$-substituted or unsubstituted $C_{10}$-$C_{36}$ alkyl. In some embodiments, $R^1$ is $R^{12}$-substituted or unsubstituted $C_{12}$-$C_{36}$ alkyl. In some embodiments, $R^1$ is $R^{12}$-substituted or unsubstituted $C_{14}$-$C_{36}$ alkyl. In some embodiments, $R^1$ is $R^{12}$-substituted or unsubstituted $C_{16}$-$C_{36}$ alkyl. In some embodiments, $R^1$ is $R^{12}$-substituted or unsubstituted $C_{18}$-$C_{36}$ alkyl. In some embodiments, $R^1$ is $R^{12}$-substituted or unsubstituted $C_{20}$-$C_{36}$ alkyl. In some embodiments, $R^1$ is $R^{12}$-substituted or unsubstituted $C_{22}$-$C_{36}$ alkyl. In some embodiments, $R^1$ is $R^{12}$-substituted or unsubstituted $C_{24}$-$C_{36}$ alkyl. In some related embodiments, the alkyl is a saturated alkyl. In other related embodiments, n is as defined in an embodiment above (e.g. n is at least 25; or at least 35, e.g. 35 to 100).

In some embodiments, $R^1$ is $R^{12}$-substituted or unsubstituted $C_{10}$-$C_{28}$ alkyl. In some embodiments, $R^1$ is $R^{12}$-substituted or unsubstituted $C_{12}$-$C_{28}$ alkyl. In some embodiments, $R^1$ is $R^{12}$-substituted or unsubstituted $C_{14}$-$C_{28}$ alkyl. In some embodiments, $R^1$ is $R^{12}$-substituted or unsubstituted $C_{16}$-$C_{28}$ alkyl. In some embodiments, $R^1$ is $R^{12}$-substituted or unsubstituted $C_{18}$-$C_{28}$ alkyl. In some embodiments, $R^1$ is $R^{12}$-substituted or unsubstituted $C_{20}$-$C_{28}$ alkyl. In some embodiments, $R^1$ is $R^{12}$-substituted or unsubstituted $C_{22}$-$C_{28}$ alkyl. In some embodiments, $R^1$ is $R^{12}$-substituted or unsubstituted $C_{24}$-$C_{28}$ alkyl. In some related embodiments, the alkyl is a saturated alkyl. In other related embodiments, n is as defined in an embodiment above (e.g. n is at least 25; or at least 35, e.g. 35 to 100).

In some embodiments, $R^1$ is branched unsubstituted $C_{12}$-$C_{100}$ alkyl. In other embodiments, $R^1$ is linear unsubstituted $C_{12}$-$C_{100}$ alkyl. In some embodiments, $R^1$ is branched unsubstituted $C_{16}$-$C_{100}$ alkyl. In other embodiments, $R^1$ is linear unsubstituted $C_{16}$-$C_{100}$ alkyl. In some embodiments, $R^1$ is branched unsubstituted $C_{18}$-$C_{100}$ alkyl. In other embodiments, $R^1$ is linear unsubstituted $C_{18}$-$C_{100}$ alkyl. In some embodiments, $R^1$ is branched unsubstituted $C_{20}$-$C_{100}$ alkyl. In other embodiments, $R^1$ is linear unsubstituted $C_{20}$-$C_{100}$ alkyl. In some embodiments, $R^1$ is branched unsubstituted $C_{22}$-$C_{100}$ alkyl. In other embodiments, $R^1$ is linear unsubstituted $C_{22}$-$C_{100}$ alkyl. In some embodiments, $R^1$ is branched unsubstituted $C_{24}$-$C_{100}$ alkyl. In other embodiments, $R^1$ is linear unsubstituted $C_{24}$-$C_{100}$ alkyl. In some related embodiments, the alkyl is a saturated alkyl. In other related embodiments, n is as defined in an embodiment above (e.g. n is at least 25; or at least 35, e.g. 35 to 100).

In some embodiments, $R^1$ is branched unsubstituted $C_{12}$-$C_{50}$ alkyl. In other embodiments, $R^1$ is linear unsubstituted $C_{12}$-$C_{50}$ alkyl. In some embodiments, $R^1$ is branched unsubstituted $C_{16}$-$C_{50}$ alkyl. In other embodiments, $R^1$ is linear unsubstituted $C_{16}$-$C_{50}$ alkyl. In some embodiments, $R^1$ is branched unsubstituted $C_{18}$-$C_{50}$ alkyl. In other embodiments, $R^1$ is linear unsubstituted $C_{18}$-$C_{50}$ alkyl. In some embodiments, $R^1$ is branched unsubstituted $C_{20}$-$C_{50}$ alkyl. In other embodiments, $R^1$ is linear unsubstituted $C_{20}$-$C_{50}$ alkyl. In some embodiments, $R^1$ is branched unsubstituted $C_{22}$-$C_{50}$ alkyl. In other embodiments, $R^1$ is linear unsubstituted $C_{22}$-$C_{50}$ alkyl. In some embodiments, $R^1$ is branched unsubstituted $C_{24}$-$C_{50}$ alkyl. In other embodiments, $R^1$ is linear unsubstituted $C_{24}$-$C_{50}$ alkyl. In some related embodiments, the alkyl is a saturated alkyl. In other related embodiments, n is as defined in an embodiment above (e.g. n is at least 25; or at least 35, e.g. 35 to 100).

In some embodiments, $R^1$ is branched unsubstituted $C_{12}$-$C_{40}$ alkyl. In other embodiments, $R^1$ is linear unsubstituted $C_{12}$-$C_{40}$ alkyl. In some embodiments, $R^1$ is branched unsubstituted $C_{16}$-$C_{40}$ alkyl. In other embodiments, $R^1$ is linear unsubstituted $C_{16}$-$C_{40}$ alkyl. In some embodiments, $R^1$ is branched unsubstituted $C_{18}$-$C_{40}$ alkyl. In other embodiments, $R^1$ is linear unsubstituted $C_{18}$-$C_{40}$ alkyl. In some embodiments, $R^1$ is branched unsubstituted $C_{20}$-$C_{40}$ alkyl. In other embodiments, $R^1$ is linear unsubstituted $C_{20}$-$C_{40}$ alkyl. In some embodiments, $R^1$ is branched unsubstituted $C_{22}$-$C_{40}$ alkyl. In other embodiments, $R^1$ is linear unsubstituted $C_{22}$-$C_{40}$ alkyl. In some embodiments, $R^1$ is branched unsubstituted $C_{24}$-$C_{40}$ alkyl. In other embodiments, $R^1$ is linear unsubstituted $C_{24}$-$C_{40}$ alkyl. In some related embodiments, the alkyl is a saturated alkyl. In other related embodiments, n is as defined in an embodiment above (e.g. n is at least 25; or at least 35, e.g. 35 to 100).

In some embodiments, $R^1$ is branched unsubstituted $C_{12}$-$C_{36}$ alkyl. In other embodiments, $R^1$ is linear unsubstituted $C_{12}$-$C_{36}$ alkyl. In some embodiments, $R^1$ is branched unsubstituted $C_{16}$-$C_{36}$ alkyl. In other embodiments, $R^1$ is linear unsubstituted $C_{16}$-$C_{36}$ alkyl. In some embodiments, $R^1$ is branched unsubstituted $C_{18}$-$C_{36}$ alkyl. In other embodiments, $R^1$ is linear unsubstituted $C_{18}$-$C_{36}$ alkyl. In some embodiments, $R^1$ is branched unsubstituted $C_{20}$-$C_{36}$ alkyl. In other embodiments, $R^1$ is linear unsubstituted $C_{20}$-$C_{36}$ alkyl. In some embodiments, $R^1$ is branched unsubstituted $C_{22}$-$C_{36}$ alkyl. In other embodiments, $R^1$ is linear unsubstituted $C_{22}$-$C_{36}$ alkyl. In some embodiments, $R^1$ is branched unsubstituted $C_{24}$-$C_{36}$ alkyl. In other embodiments, $R^1$ is linear unsubstituted $C_{24}$-$C_{36}$ alkyl. In some related embodiments, the alkyl is a saturated alkyl. In other related embodiments, n is as defined in an embodiment above (e.g. n is at least 25; or at least 35, e.g. 35 to 100).

In some embodiments, $R^1$ is branched unsubstituted $C_{12}$-$C_{28}$ alkyl. In other embodiments, $R^1$ is linear unsubstituted $C_{12}$-$C_{28}$ alkyl. In some embodiments, $R^1$ is branched unsubstituted $C_{16}$-$C_{28}$ alkyl. In other embodiments, $R^1$ is linear unsubstituted $C_{16}$-$C_{28}$ alkyl. In some embodiments, $R^1$ is branched unsubstituted $C_{18}$-$C_{28}$ alkyl. In other embodiments, $R^1$ is linear unsubstituted $C_{18}$-$C_{28}$ alkyl. In some embodiments, $R^1$ is branched unsubstituted $C_{20}$-$C_{28}$ alkyl. In other embodiments, $R^1$ is linear unsubstituted $C_{20}$-$C_{28}$ alkyl. In some embodiments, $R^1$ is branched unsubstituted $C_{22}$-$C_{28}$ alkyl. In other embodiments, $R^1$ is linear unsubstituted $C_{22}$-$C_{28}$ alkyl. In some embodiments, $R^1$ is branched unsubstituted $C_{24}$-$C_{28}$ alkyl. In other embodiments, $R^1$ is linear unsubstituted $C_{24}$-$C_{28}$ alkyl. In some related embodiments, the alkyl is a saturated alkyl. In other related embodiments, n is as defined in an embodiment above (e.g. n is at least 25; or at least 35, e.g. 35 to 100).

In some embodiments, where $R^1$ is a linear or branched unsubstituted alkyl (e.g. branched unsubstituted $C_{12}$-$C_{100}$ alkyl), the alkyl is a saturated alkyl (e.g. a linear or branched unsubstituted saturated alkyl or branched unsubstituted $C_{12}$-$C_{100}$ saturated alkyl). A "saturated alkyl," as used herein, refers to an alkyl consisting only of hydrogen and carbon atoms and are boded exclusively by single bonds. Thus, in some embodiments, $R^1$ may be linear or branched unsubstituted saturated alkyl. In some embodiments, $R^1$ is branched unsubstituted $C_{12}$-$C_{100}$ saturated alkyl. In other embodiments, $R^1$ is linear unsubstituted $C_{12}$-$C_{100}$ saturated alkyl. In some embodiments, $R^1$ is branched unsubstituted $C_{16}$-$C_{100}$ saturated alkyl. In other embodiments, $R^1$ is linear unsubstituted $C_{16}$-$C_{100}$ saturated alkyl. In some embodiments, $R^1$ is branched unsubstituted $C_{24}$-$C_{36}$ saturated alkyl. In other embodiments, $R^1$ is linear unsubstituted $C_{24}$-$C_{36}$ saturated alkyl. In other embodiments, $R^1$ is linear unsubstituted $C_{24}$-$C_{28}$ saturated alkyl. In other embodiments, $R^1$ is branched unsubstituted $C_{24}$-$C_{28}$ saturated alkyl.

In some embodiments, $R^1$ is formed using the Guerbet reaction.

In some embodiments, where $R^1$ is a linear or branched unsubstituted alkyl (e.g. branched unsubstituted $C_{10}$-$C_{20}$ alkyl), the alkyl is an unsaturated alkyl (e.g. a linear or branched unsubstituted unsaturated alkyl or branched unsubstituted $C_{10}$-$C_{20}$ unsaturated alkyl). An "unsaturated alkyl," as used herein, refers to an alkyl having one or more double bonds or triple bonds. An unsaturated alkyl as provided herein can be mono- or polyunsaturated and can include di- and multivalent radicals. Thus, in some embodiments, $R^1$ may be linear or branched unsubstituted unsaturated alkyl. In some embodiments, $R^1$ is branched unsubstituted $C_{10}$-$C_{20}$ unsaturated alkyl. In other embodiments, $R^1$ is linear unsubstituted $C_{10}$-$C_{20}$ unsaturated alkyl. In some embodiments, $R^1$ is branched unsubstituted $C_{16}$-$C_{20}$ unsaturated alkyl. In other embodiments, $R^1$ is linear unsubstituted $C_{16}$-$C_{20}$ unsaturated alkyl. In some embodiments, $R^1$ is branched unsubstituted $C_{12}$-$C_{18}$ unsaturated alkyl. In other embodiments, $R^1$ is linear unsubstituted $C_{12}$-$C_{18}$ unsaturated alkyl. In some embodiments, $R^1$ is linear unsubstituted $C_{18}$ unsaturated alkyl. In other embodiments, $R^1$ is branched unsubstituted $C_{18}$ unsaturated alkyl. In one embodiment, $R^1$ is linear unsubstituted $C_{18}$ mono-unsaturated alkyl. In another embodiment, $R^1$ is linear unsubstituted $C_{18}$ poly-unsaturated alkyl. In one embodiment, $R^1$ is branched unsubstituted $C_{18}$ mono-unsaturated alkyl. In another embodiment, $R^1$ is branched unsubstituted $C_{18}$ poly-unsaturated alkyl.

In some embodiments, $R^1$ is branched unsubstituted $C_{12}$-$C_{100}$ heteroalkyl. In other embodiments, $R^1$ is linear unsubstituted $C_{12}$-$C_{100}$ heteroalkyl. In some embodiments, $R^1$ is branched unsubstituted $C_{16}$-$C_{100}$ heteroalkyl. In other embodiments, $R^1$ is linear unsubstituted $C_{16}$-$C_{100}$ heteroalkyl. In some embodiments, $R^1$ is branched unsubstituted $C_{18}$-$C_{100}$ heteroalkyl. In other embodiments, $R^1$ is linear unsubstituted $C_{18}$-$C_{100}$ heteroalkyl. In some embodiments, $R^1$ is branched unsubstituted $C_{20}$-$C_{100}$ heteroalkyl. In other embodiments, $R^1$ is linear unsubstituted $C_{20}$-$C_{100}$ heteroalkyl. In some embodiments, $R^1$ is branched unsubstituted $C_{22}$-$C_{100}$ heteroalkyl. In other embodiments, $R^1$ is linear unsubstituted $C_{22}$-$C_{100}$ heteroalkyl. In some embodiments, $R^1$ is branched unsubstituted $C_{24}$-$C_{100}$ heteroalkyl. In other embodiments, $R^1$ is linear unsubstituted $C_{24}$-$C_{100}$ heteroalkyl. In some related embodiments, the heteroalkyl is a saturated heteroalkyl. In other related embodiments, n is as defined in an embodiment above (e.g. n is at least 25; or at least 35, e.g. 35 to 100).

In some embodiments, $R^1$ is branched unsubstituted $C_{12}$-$C_{50}$ heteroalkyl. In other embodiments, $R^1$ is linear unsubstituted $C_{12}$-$C_{50}$ heteroalkyl. In some embodiments, $R^1$ is branched unsubstituted $C_{16}$-$C_{50}$ heteroalkyl. In other embodiments, $R^1$ is linear unsubstituted $C_{16}$-$C_{50}$ heteroalkyl. In some embodiments, $R^1$ is branched unsubstituted $C_{18}$-$C_{50}$ heteroalkyl. In other embodiments, $R^1$ is linear unsubstituted $C_{18}$-$C_{50}$ heteroalkyl. In some embodiments, $R^1$ is branched unsubstituted $C_{20}$-$C_{50}$ heteroalkyl. In other embodiments, $R^1$ is linear unsubstituted $C_{20}$-$C_{50}$ heteroalkyl. In some embodiments, $R^1$ is branched unsubstituted $C_{22}$-$C_{50}$ heteroalkyl. In other embodiments, $R^1$ is linear unsubstituted $C_{22}$-$C_{50}$ heteroalkyl. In some embodiments, $R^1$ is branched unsubstituted $C_{24}$-$C_{50}$ heteroalkyl. In other embodiments, $R^1$ is linear unsubstituted $C_{24}$-$C_{50}$ heteroalkyl. In some related embodiments, the heteroalkyl is a saturated heteroalkyl. In other related embodiments, n is as defined in an embodiment above (e.g. n is at least 25; or at least 35, e.g. 35 to 100).

In some embodiments, $R^1$ is branched unsubstituted $C_{12}$-$C_{40}$ heteroalkyl. In other embodiments, $R^1$ is linear unsubstituted $C_{12}$-$C_{40}$ heteroalkyl. In some embodiments, $R^1$ is branched unsubstituted $C_{16}$-$C_{40}$ heteroalkyl. In other embodiments, $R^1$ is linear unsubstituted $C_{16}$-$C_{40}$ heteroalkyl. In some embodiments, $R^1$ is branched unsubstituted $C_{18}$-$C_{40}$ heteroalkyl. In other embodiments, $R^1$ is linear unsubstituted $C_{18}$-$C_{40}$ heteroalkyl. In some embodiments, $R^1$ is branched unsubstituted $C_{20}$-$C_{40}$ heteroalkyl. In other embodiments, $R^1$ is linear unsubstituted $C_{20}$-$C_{40}$ heteroalkyl. In some embodiments, $R^1$ is branched unsubstituted $C_{22}$-$C_{40}$ heteroalkyl. In other embodiments, $R^1$ is linear unsubstituted $C_{22}$-$C_{40}$ heteroalkyl. In some embodiments, $R^1$ is branched unsubstituted $C_{24}$-$C_{40}$ heteroalkyl. In other embodiments, $R^1$ is linear unsubstituted $C_{24}$-$C_{40}$ heteroalkyl. In some related embodiments, the heteroalkyl is a saturated heteroalkyl. In other related embodiments, n is as defined in an embodiment above (e.g. n is at least 25; or at least 35, e.g. 35 to 100).

In some embodiments, $R^1$ is branched unsubstituted $C_{12}$-$C_{36}$ heteroalkyl. In other embodiments, $R^1$ is linear unsubstituted $C_{12}$-$C_{36}$ heteroalkyl. In some embodiments, $R^1$ is branched unsubstituted $C_{16}$-$C_{36}$ heteroalkyl. In other embodiments, $R^1$ is linear unsubstituted $C_{16}$-$C_{36}$ heteroalkyl. In some embodiments, $R^1$ is branched unsubstituted $C_{18}$-$C_{36}$ heteroalkyl. In other embodiments, $R^1$ is linear unsubstituted $C_{18}$-$C_{36}$ heteroalkyl. In some embodiments, $R^1$ is branched unsubstituted $C_{20}$-$C_{36}$ heteroalkyl. In other embodiments, $R^1$ is linear unsubstituted $C_{20}$-$C_{36}$ heteroalkyl. In some embodiments, $R^1$ is branched unsubstituted $C_{22}$-$C_{36}$ heteroalkyl. In other embodiments, $R^1$ is linear unsubstituted $C_{22}$-$C_{36}$ heteroalkyl. In some embodiments, $R^1$ is branched unsubstituted $C_{24}$-$C_{36}$ heteroalkyl. In other embodiments, $R^1$ is linear unsubstituted $C_{24}$-$C_{36}$ heteroalkyl. In some related embodiments, the heteroalkyl is a saturated heteroalkyl. In other related embodiments, n is as defined in an embodiment above (e.g. n is at least 25; or at least 35, e.g. 35 to 100).

In some embodiments, where $R^1$ is a linear or branched unsubstituted heteroalkyl (e.g. branched unsubstituted $C_{12}$-$C_{100}$ heteroalkyl), the heteroalkyl is a saturated heteroalkyl (e.g. a linear or branched unsubstituted saturated heteroalkyl or branched unsubstituted $C_{12}$-$C_{100}$ saturated heteroalkyl). A "saturated heteroalkyl," as used herein, refers to an heteroalkyl consisting only of hydrogen, carbon atoms and heteroatoms, which are bonded exclusively by single bonds. Thus, in some embodiments, $R^1$ may be linear or branched unsubstituted saturated heteroalkyl. In some embodiments, $R^1$ is branched unsubstituted $C_{12}$-$C_{100}$ saturated heteroalkyl. In other embodiments, $R^1$ is linear unsubstituted $C_{12}$-$C_{100}$ saturated heteroalkyl. In some embodiments, $R^1$ is branched unsubstituted $C_{16}$-$C_{100}$ saturated heteroalkyl. In other embodiments, $R^1$ is linear unsubstituted $C_{16}$-$C_{100}$ saturated heteroalkyl. In some embodiments, $R^1$ is branched unsubstituted $C_{24}$-$C_{36}$ saturated heteroalkyl. In other embodiments, $R^1$ is linear unsubstituted $C_{24}$-$C_{36}$ saturated heteroalkyl.

In some embodiments, $R^1$ is $R^6$-substituted phenyl. $R^6$ may be $R^7$-substituted or unsubstituted $C_1$-$C_{50}$ alkyl (e.g. $C_2$-$C_6$ alkyl). In some embodiments, $R^6$ is $R^7$-substituted methyl. $R^6$ may be branched $R^7$-substituted $C_1$-$C_{50}$ alkyl (e.g. branched $C_2$-$C_6$ alkyl). In some embodiments, $R^6$ is branched $R^7$-substituted propyl. In some embodiments, $R^7$ is $R^8$-substituted or unsubstituted alkyl (e.g. unsubstituted methyl), $R^8$-substituted or unsubstituted aryl (e.g. substituted or unsubstituted phenyl), or $R^8$-substituted or unsubstituted cycloalkyl. In some further embodiments, $R^7$ is independently unsubstituted $C_1$-$C_4$ alkyl (e.g. methyl) or $R^8$-substituted aryl (e.g. $R^8$-substituted phenyl). In some further embodiments, $R^8$ is $R^9$-substituted or unsubstituted alkyl or $R^9$-substituted or unsubstituted cycloalkyl. In some embodiments, $R^1$ is having the formula:

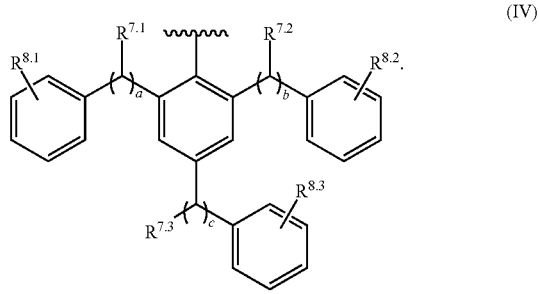

(IV)

In some embodiments, a compound as described herein may include multiple instances of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$ and/or other variables. In such embodiments, each variable may optional be different and be appropriately labeled to distinguish each group for greater clarity. For example, where each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and/or $R^{21}$, is different, they may be referred to, for example, as $R^{1.1}$, $R^{1.2}$, $R^{1.3}$, $R^{1.4}$, $R^{2.1}$, $R^{2.2}$, $R^{2.3}$, $R^{2.4}$, $R^{3.1}$, $R^{3.2}$, $R^{3.3}$, $R^{3.4}$, $R^{4.1}$, $R^{4.2}$, $R^{4.3}$, $R^{4.4}$, $R^{5.1}$, $R^{5.2}$, $R^{5.3}$, $R^{5.4}$, $R^{6.1}$, $R^{6.2}$, $R^{6.3}$, $R^{6.4}$, $R^{7.1}$, $R^{7.2}$, $R^{7.3}$, $R^{7.4}$, $R^{8.1}$, $R^{8.2}$, $R^{8.3}$, $R^{8.4}$, $R^{9.1}$, $R^{9.2}$, $R^{9.3}$, $R^{9.4}$, $R^{10.1}$, $R^{10.2}$, $R^{10.3}$, $R^{10.4}$, $R^{11.1}$, $R^{11.2}$, $R^{11.3}$, $R^{11.4}$, $R^{12.1}$, $R^{12.2}$, $R^{12.3}$, $R^{12.4}$, $R^{13.1}$, $R^{13.2}$, $R^{13.3}$, $R^{13.4}$, $R^{14.1}$, $R^{14.2}$, $R^{14.3}$, $R^{14.4}$, $R^{15.1}$, $R^{15.2}$, $R^{15.3}$, $R^{15.4}$, $R^{16.1}$, $R^{16.2}$, $R^{16.3}$, $R^{16.4}$, $R^{17.1}$, $R^{17.2}$, $R^{17.3}$, $R^{17.4}$, $R^{18.1}$, $R^{18.2}$, $R^{18.3}$, $R^{18.4}$, $R^{19.1}$, $R^{19.2}$, $R^{19.3}$, $R^{19.4}$, $R^{20.1}$, $R^{20.2}$, $R^{20.3}$, $R^{20.4}$, $R^{21.1}$, $R^{21.2}$, $R^{21.3}$, and/or $R^{21.4}$, respectively, wherein the definition of $R^1$ is assumed by $R^{1.1}$, $R^{1.2}$, $R^{1.3}$, and/or $R^{1.4}$, the definition of $R^2$ is assumed by $R^{2.1}$, $R^{2.2}$, $R^{2.3}$, and/or $R^{2.4}$, the definition of $R^3$ is assumed by $R^{3.1}$, $R^{3.2}$, $R^{3.3}$, and/or $R^{3.4}$, the definition of $R^4$ is assumed by $R^{4.1}$, $R^{4.2}$, $R^{4.3}$, and/or $R^{4.4}$, the definition of $R^5$ is assumed by $R^{5.1}$, $R^{5.2}$, $R^{5.3}$, and/or $R^{5.4}$, the definition of $R^6$ is assumed by $R^{6.1}$, $R^{6.2}$, $R^{6.3}$, and/or $R^{6.4}$, the definition of $R^7$ is assumed by $R^{7.1}$, $R^{7.2}$, $R^{7.3}$, and/or $R^{7.4}$, the definition of $R^8$ is assumed by $R^{8.1}$, $R^{8.2}$, $R^{8.3}$, and/or $R^{8.4}$, the definition of $R^9$ is assumed by $R^{9.1}$, $R^{9.2}$, $R^{9.3}$, and/or $R^{9.4}$, the definition of $R^{10}$ is assumed by $R^{10.1}$, $R^{10.2}$, $R^{10.3}$, and/or $R^{10.4}$, the definition of $R^{11}$ is assumed by $R^{11.1}$, $R^{11.2}$, $R^{11.3}$, and/or $R^{11.4}$, the definition of $R^{12}$ is assumed by $R^{12.1}$, $R^{12.2}$, $R^{12.3}$, and/or $R^{12.4}$, the definition of $R^{13}$ is assumed by $R^{13.1}$, $R^{13.2}$, $R^{13.3}$, and/or $R^{13.4}$, the definition of $R^{14}$ is assumed by $R^{14.1}$, $R^{14.2}$, $R^{14.3}$, and/or $R^{14.4}$, the definition of $R^{15}$ is assumed by $R^{15.1}$, $R^{15.2}$, $R^{15.3}$, and/or $R^{15.4}$, the definition of $R^{16}$ is assumed by $R^{16.1}$, $R^{16.2}$, $R^{16.3}$, and/or $R^{16.4}$, the definition of $R^{17}$ is assumed by $R^{17.1}$, $R^{17.2}$, $R^{17.3}$, and/or $R^{17.4}$, the definition of $R^{18}$ is assumed by $R^{18.1}$, $R^{18.2}$, $R^{18.3}$, and/or $R^{18.4}$, the definition of $R^{19}$ is assumed by $R^{19.1}$, $R^{19.2}$, $R^{19.3}$, and/or $R^{19.4}$, the definition of $R^{20}$ is assumed by $R^{20.1}$, $R^{20.2}$, $R^{20.3}$, and/or $R^{20.4}$, the definition of $R^{21}$ is assumed by $R^{21.1}$, $R^{21.2}$, $R^{21.3}$, and/or $R^{21.4}$. The variables used within a definition of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and/or $R^{21}$, and/or other variables that appear at multiple instances and are different may similarly be appropriately labeled to distinguish each group for greater clarity.

In formula (IV), $R^{7.1}$, $R^{7.2}$, $R^{7.3}$, $R^{8.1}$, $R^{8.2}$, and $R^{8.3}$ are defined as $R^7$ and $R^8$ above. For example, in some embodiments, $R^{7.1}$ is $R^{8.1}$-substituted or unsubstituted $C_1$-$C_{50}$ alkyl, (e.g. a branched and/or saturated alkyl), $R^{8.1}$-substituted or unsubstituted aryl, or $R^{8.1}$-substituted or unsubstituted cycloalkyl. $R^{7.2}$ may be $R^{8.2}$-substituted or unsubstituted $C_1$-$C_{50}$ alkyl, (e.g. a branched and/or saturated alkyl), $R^{8.2}$-substituted or unsubstituted aryl, or $R^{8.2}$-substituted or unsubstituted cycloalkyl. $R^{7.3}$ may be $R^{8.3}$-substituted or unsubstituted $C_1$-$C_{50}$ alkyl, (e.g. a branched and/or saturated alkyl), $R^{8.3}$-substituted or unsubstituted aryl, or $R^{8.3}$-substituted or unsubstituted cycloalkyl. In some embodiments, $R^{7.1}$, $R^{7.2}$ and $R^{7.3}$ are independently unsubstituted $C_1$-$C_{25}$ alkyl (e.g. a branched and/or saturated alkyl). In other embodiments, $R^{7.1}$, $R^{7.2}$ and $R^{7.3}$ are independently branched unsubstituted $C_1$-$C_{25}$ saturated alkyl. In some embodiments, $R^{8.1}$ is $R^{9.1}$-substituted or unsubstituted $C_1$-$C_{50}$ alkyl, (e.g. a branched and/or saturated alkyl), $R^{9.1}$-substituted or unsubstituted aryl, or $R^{9.1}$-substituted or unsubstituted cycloalkyl. $R^{8.2}$ may be $R^{9.2}$-substituted or unsubstituted $C_1$-$C_{50}$ alkyl, (e.g. a branched and/or saturated alkyl), $R^{9.2}$-substituted or unsubstituted aryl, or $R^{9.2}$-substituted or unsubstituted cycloalkyl. $R^{8.3}$ may be $R^{9.3}$-substituted or unsubstituted $C_1$-$C_{50}$ alkyl, (e.g. a branched and/or saturated alkyl), $R^{9.3}$-substituted or unsubstituted aryl, or $R^{9.3}$-substituted or unsubstituted cycloalkyl. $R^{9.1}$, $R^{9.2}$ and $R^{9.3}$ may be independently substituted or unsubstituted alkyl, substituted or unsubstituted heteroalkyl, substituted or unsubstituted aryl, or substituted or unsubstituted cycloalkyl. In some embodiments, $R^{8.1}$, $R^{8.2}$ and $R^{8.3}$ are independently $C_1$-$C_{25}$ alkyl. In other embodiments, $R^{8.1}$, $R^{8.2}$ and $R^{8.3}$ are independently branched unsubstituted $C_1$-$C_{25}$ saturated alkyl. The symbols a, b, and c are independently integers from 1 to 15. In some embodiments, a, b, and c are independently integers from 1 to 10. In some embodiments, a, b, and c are independently integers from 1 to 10. In some embodiments, a, b, and c are 1. Each $R^{7.1}$, $R^{7.2}$, $R^{7.3}$, $R^{8.1}$, $R^{8.2}$ and $R^{8.3}$ are optionally different.

In formula (I), (II), or (III) $R^2$, $R^3$, and $R^4$ may be the same or different and may each independently be unsubstituted alkyl, unsubstituted cycloalkyl, unsubstituted aryl, or —$OR^{13}$, —$C(O)OR^{13}$, or —$S(O)_mR^{13}$. In some embodiments, $R^2$, $R^3$, and $R^4$ are the same or different and are each independently unsubstituted alkyl, unsubstituted cycloalkyl, unsubstituted aryl, or —$OR^{13}$, —$C(O)OR^{13}$, or —$S(O)_mR^{13}$. In some embodiments, $R^2$, $R^3$, and $R^4$ are independently substituted or unsubstituted $C_1$-$C_{20}$ (e.g. $C_1$-$C_6$) alkyl, substituted or unsubstituted $C_3$-$C_8$ (e.g., $C_5$-$C_7$) cycloalkyl, or substituted or unsubstituted $C_5$-$C_{10}$ (e.g. $C_5$-$C_6$) aryl. $R^{13}$ may independently be hydrogen, unsubstituted alkyl or unsubstituted cycloalkyl. In some embodiments, $R^2$, $R^3$, and $R^4$ are unsubstituted $C_1$-$C_6$ alkyl. In some embodiments, $R^2$, $R^3$, and $R^4$ are unsubstituted $C_1$-$C_4$ alkyl. In some further embodiments, $R^2$, $R^3$, and $R^4$ are methyl. In some other further embodiments, $R^2$, $R^3$, and $R^4$ are ethyl. In some embodiments, $R^2$, $R^3$, and $R^4$ are —$OR^{13}$, wherein $R^{13}$ is hydrogen. In some embodiments, $R^2$, $R^3$, and $R^4$ are independently —$OR^{13}$, or —$C(O)OR^{13}$. In some further embodiments, $R^{13}$ is hydrogen. $R^2$, $R^3$, and $R^4$ may be the same or independently different. In some embodiments, $R^2$, $R^3$, and $R^4$ are different. In some embodiments, $R^2$ and $R^4$ are —$OR^{13}$ and $R^3$ is —$C(O)OR^{13}$, wherein $R^{13}$ is hydrogen. Thus, in some embodiments, $R^2$ and $R^4$ are —OH and $R^3$ is —C(O)OH. In other embodiments, $R^2$ and $R^4$ are —$OR^{13}$ and $R^3$ is —$S(O)_mR^{13}$, wherein $R^{13}$ is hydrogen and m is 3. Thus, in some embodiments, $R^2$ and $R^4$ are —OH and $R^3$ is —$S(O)_3H$. A person of skill in the art will immediately recognize that the compounds provided herein include acceptable salts thereof. For example, where the compound includes a —C(O)OH group, a person having ordinary skill in the art will understand that —$C(O)O^-$ with an appropriate accompanying counterion (e.g. $Na^-$, $K^+$, $Ca^{2+}$, $Mg^{2+}$) is an acceptable salt. Likewise, an acceptable salt of —$S(O)_3H$ would include —$S(O)_3^-$ with an appropriate accompanying counterion (e.g. $Na^+$, $K^+$, $Ca^{2+}$, $Mg^{2+}$). Thus, a compound of formula (I), (II), or (III) as disclosed herein, wherein $R^2$, $R^3$, and $R^4$ are independently —C(O)OH or —$S(O)_3H$ may include a compound of formula (I), (II), or (III), wherein $R^2$, $R^3$, and $R^4$ are independently —$C(O)O^-$ or —$S(O)_3^-$.

$L^1$, $L^2$, $L^3$, and $L^4$ may be the same or may be independently different and may each independently be a bond, substituted or unsubstituted alkylene, substituted or unsubstituted heteroalkylene, substituted or unsubstituted cycloalkylene, or substituted or unsubstituted arylene. In some embodiments, $L^1$, $L^2$, $L^3$, and $L^4$ are the same or different and are each independently a bond, substituted or unsubstituted alkylene, substituted or unsubstituted heteroalkylene, substituted or unsubstituted cycloalkylene, or substituted or unsubstituted arylene. In some embodiments, $L^1$, $L^2$, $L^3$, and $L^4$ are independently substituted or unsubstituted $C_1$-$C_{20}$ (e.g., $C_1$-$C_8$) alkylene, substituted or unsubstituted 2 to 20 membered (e.g., 2 to 8 membered) heteroalkylene, substituted or unsubstituted 2 to 20 membered (e.g., 2 to 8 membered) cycloalkylene, or substituted or unsubstituted $C_5$-$C_{20}$ arylene (e.g. $C_6$ arylene). $L^1$, $L^2$, $L^3$, and $L^4$ may be the same or may be different. In some embodiments, $L^1$, $L^2$, $L^3$, and $L^4$ are independently different. In some embodiments, $L^1$ is substituted alkylene and $L^2$, $L^3$ and $L^4$ are unsubstituted alkylene. For example, $L^1$ may be substituted $C_1$-$C_5$ alkylene (e.g. substituted $C_3$ alkylene) and $L^2$, $L^3$ and $L^4$ are unsubstituted $C_1$-$C_6$ alkylene (e.g. $C_2$ alkylene). In some embodiments, $L^1$ is substituted propylene. In some further embodiments, $L^1$ has the formula

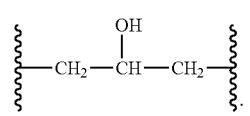

(V)

In some embodiments, $L^1$ is substituted $C_3$ alkylene (e.g. as described in formula (V)) and $L^2$, $L^3$ and $L^4$ are $C_2$ alkylene (i.e. ethylene). In other embodiments, $L^1$ is substituted $C_3$ alkylene (e.g. as described in formula (V)), $L^2$ and $L^4$ are $C_2$ alkylene (i.e. ethylene) and $L^3$ is methylene. In some embodiments, $L^1$ is substituted $C_3$ alkylene (i.e. substituted propylene) and $L^2$, $L^3$ and $L^4$ are a bond.

As described herein, $R^2$, $R^3$, and $R^4$ may be —$OR^{13}$, wherein $R^{13}$ is hydrogen. Thus, in some embodiments, $R^2$, $R^3$, and $R^4$ are —OH. When $R^2$, $R^3$, and $R^4$ are —OH, $L^2$, $L^3$, and $L^4$ may be independently unsubstituted $C_1$-$C_4$ alkylene. Thus, in some embodiments, $R^2$, $R^3$, and $R^4$ are —OH and $L^2$, $L^3$, and $L^4$ are independently unsubstituted $C_1$-$C_4$ alkylene. In some further embodiments, $L^2$, $L^3$, and $L^4$ are ethylene. In other embodiments, $R^2$ and $R^4$ are independently —$OR^{13}$ and $R^3$ is —$C(O)OR^{13}$. In some further embodiments, $R^{13}$ is hydrogen and $L^2$, $L^3$, and $L^4$ are independently unsubstituted $C_1$-$C_4$ alkylene (e.g. unsubstituted methylene or ethylene). In some further embodiments, $L^2$ and $L^4$ are ethylene and $L^3$ is methylene. In some embodiments, $R^2$ and $R^4$ are independently —$OR^{13}$ and $R^3$ is —$S(O)_3R^{13}$. In some further embodiments, $R^{13}$ is hydrogen and $L^2$, $L^3$, and $L^4$ are independently unsubstituted $C_1$-$C_4$ alkylene (e.g. methylene or ethylene).

In some embodiments, $R^5$ is independently hydrogen or unsubstituted $C_1$-$C_5$ alkyl. In some embodiments, $R^5$ is branched unsubstituted $C_1$-$C_5$ saturated alkyl. In some embodiments, $R^5$ is hydrogen or unsubstituted $C_1$ or $C_2$ alkyl. In some related embodiments, $R^5$ is hydrogen or branched unsubstituted $C_1$ or $C_2$ saturated alkyl. In some embodiments, $R^5$ is hydrogen or a branched unsubstituted $C_1$ saturated alkyl. In other embodiments, $R^5$ is $C_2$-$C_6$ alkyl. In some embodiments, $R^5$ is a branched unsubstituted $C_2$-$C_6$ saturated alkyl. In some embodiments, $R^5$ is not $C_2$ alkyl. In other embodiments, $R^5$ is $C_1$ alkyl or $C_3$-$C_6$ alkyl. In some embodiments, $R^5$ is a branched unsubstituted $C_3$-$C_6$ saturated alkyl. In other embodiments, $R^5$ is hydrogen.

In some embodiments, where multiple $R^5$ substituents are present and at least two $R^5$ substituents are different, $R^5$ substituents with the fewest number of carbons are present toward the side of the compound of formula (I) bound to the $L^1$ substituent. In this embodiment, the compound of formula (I) will be increasingly hydrophilic in progressing from the $R^1$ substituent to the side of the compound of formula (I) bound to the $L^1$ substituent. The term "side of the compound of formula (I) bound to the $L^1$ substituent" refers to the side of the compound indicated by asterisks in the below structure of formula (I):

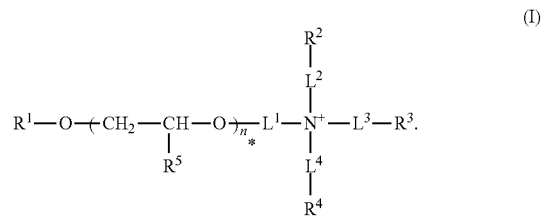

In some embodiments of the compound of formula (I), (II), (III), or embodiments thereof disclosed herein, where $R^1$ is unsubstituted $C_{25}$-$C_{32}$ alkyl, the symbol n is an integer from 21 to 210. In other embodiments, where $R^1$ is unsubstituted $C_{25}$-$C_{32}$ alkyl, the symbol n is an integer from 25 to 210. In other embodiments, where $R^1$ is unsubstituted $C_{25}$-$C_{32}$ alkyl, the symbol n is an integer from 30 to 210. In other embodiments, where $R^1$ is unsubstituted $C_{25}$-$C_{32}$ alkyl, the symbol n is an integer from 35 to 210. In other embodiments, where $R^1$ is unsubstituted $C_{25}$-$C_{32}$ alkyl, the symbol n is an integer from 40 to 210. In other embodiments, where $R^1$ is unsubstituted $C_{25}$-$C_{32}$ alkyl, the symbol n is an integer from 45 to 210. In other embodiments, where $R^1$ is unsubstituted $C_{25}$-$C_{32}$ alkyl, the symbol n is an integer from 50 to 210. In other embodiments, where $R^1$ is unsubstituted $C_{25}$-$C_{32}$ alkyl, the symbol n is an integer from 55 to 210. In other embodiments, where $R^1$ is unsubstituted $C_{25}$-$C_{32}$ alkyl, the symbol n is an integer from 60 to 210. In other embodiments, where $R^1$ is unsubstituted $C_{25}$-$C_{32}$ alkyl, the symbol n is an integer from 25 to 100. In other embodiments, where $R^1$ is unsubstituted $C_{25}$-$C_{32}$ alkyl, the symbol n is an integer from 30 to 100. In other embodiments, where $R^1$ is unsubstituted $C_{25}$-$C_{32}$ alkyl, the symbol n is an integer from 35 to 100. In other embodiments, where $R^1$ is unsubstituted $C_{25}$-$C_{32}$ alkyl, the symbol n is an integer from 40 to 100. In other embodiments, where $R^1$ is unsubstituted $C_{25}$-$C_{32}$ alkyl, the symbol n is an integer from 45 to 100. In some further embodiments, n is 50. In other embodiments, where $R^1$ is unsubstituted $C_{25}$-$C_{32}$ alkyl, the symbol n is an integer from 50 to 100. In some further embodiments, n is 95.

In other embodiments, where $R^1$ is unsubstituted $C_{25}$-$C_{32}$ alkyl, the symbol n is an integer from 55 to 100. In other embodiments, where $R^1$ is unsubstituted $C_{25}$-$C_{32}$ alkyl, the symbol n is an integer from 60 to 100. $L^1$, $L^2$, $L^3$, $L^4$, $R^2$, $R^3$, $R^4$ and $R^5$ may be any of the embodiments described above (e.g. $L^2$, $L^3$, and $L^4$ may be independently unsubstituted $C_1$-$C_3$ alkylene (e.g. methylene or ethylene), $L^1$ may be substituted $C_3$ alkylene (e.g. the compound of formula (V)), $R^2$, $R^3$, and $R^4$ may be independently —OH or —C(O)OH, and $R^5$ may be independently hydrogen or unsubstituted $C_1$-$C_3$ alkyl).

In some embodiments of the compound of formula (I), (II), (III), or embodiments thereof disclosed herein, where $R^1$ is unsubstituted $C_{25}$-$C_{35}$ heteroalkyl, the symbol n is an integer from 21 to 210. In other embodiments, where $R^1$ is unsubstituted $C_{25}$-$C_{35}$ heteroalkyl, the symbol n is an integer from 25 to 210. In other embodiments, where $R^1$ is unsubstituted $C_{25}$-$C_{35}$ heteroalkyl, the symbol n is an integer from 30 to 210. In other embodiments, where $R^1$ is unsubstituted $C_{25}$-$C_{35}$ heteroalkyl, the symbol n is an integer from 35 to 210. In other embodiments, where $R^1$ is unsubstituted $C_{25}$-$C_{35}$ heteroalkyl, the symbol n is an integer from 40 to 210. In other embodiments, where $R^1$ is unsubstituted $C_{25}$-$C_{35}$ heteroalkyl, the symbol n is an integer from 45 to 210. In other embodiments, where $R^1$ is unsubstituted $C_{25}$-$C_{35}$ heteroalkyl, the symbol n is an integer from 50 to 210. In other embodiments, where $R^1$ is unsubstituted $C_{25}$-$C_{35}$ heteroalkyl, the symbol n is an integer from 55 to 210. In other embodiments, where $R^1$ is unsubstituted $C_{25}$-$C_{35}$ heteroalkyl, the symbol n is an integer from 60 to 210. In other embodiments, where $R^1$ is unsubstituted $C_{25}$-$C_{35}$ heteroalkyl, the symbol n is an integer from 25 to 100. In other embodiments, where $R^1$ is unsubstituted $C_{25}$-$C_{35}$ heteroalkyl, the symbol n is an integer from 30 to 100. In other embodiments, where $R^1$ is unsubstituted $C_{25}$-$C_{35}$ heteroalkyl, the symbol n is an integer from 35 to 100. In other embodiments, where $R^1$ is unsubstituted $C_{25}$-$C_{35}$ heteroalkyl, the symbol n is an integer from 40 to 100. In other embodiments, where $R^1$ is unsubstituted $C_{25}$-$C_{35}$ heteroalkyl, the symbol n is an integer from 45 to 100. In some further embodiments, n is 50. In other embodiments, where $R^1$ is unsubstituted $C_{25}$-$C_{35}$ heteroalkyl, the symbol n is an integer from 50 to 100. In some further embodiments, n is 95. In other embodiments, where $R^1$ is unsubstituted $C_{25}$-$C_{35}$ heteroalkyl, the symbol n is an integer from 55 to 100. In other embodiments, where $R^1$ is unsubstituted $C_{25}$-$C_{35}$ heteroalkyl, the symbol n is an integer from 60 to 100. $L^1$, $L^2$, $L^3$, $L^4$, $R^2$, $R^3$, $R^4$ and $R^5$ may be any of the embodiments described above (e.g. $L^2$, $L^3$, and $L^4$ may be independently unsubstituted $C_1$-$C_3$ alkylene (e.g. methylene or ethylene), $L^1$ may be substituted $C_3$ alkylene (e.g. the compound of formula (V)), $R^2$, $R^3$, and $R^4$ may be independently —OH or —C(O)OH, and $R^5$ may be independently hydrogen or unsubstituted $C_1$-$C_3$ alkyl).

In some embodiments, the compound provided herein has the formula:

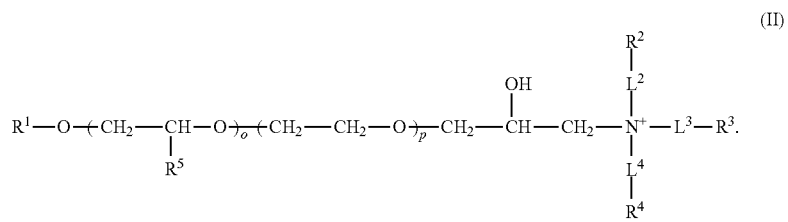

(II)

In formula (II) o is an integer from 20 to 100, p is an integer from 10 to 80, and $R^5$ is unsubstituted $C_1$-$C_3$ alkyl (e.g. methyl or ethyl). In some further embodiments, $R^5$ is methyl. In some further embodiments, $R^1$ is branched $C_{15}$-$C_{40}$ heteroalkyl, o is 10 to 40 and p is 5 to 30.

In some embodiments, p is 10 to 100. In some related embodiments, p is 10 to 90. In some related embodiments, p is 10 to 80. In some related embodiments, p is 10 to 70. In some related embodiments, p is 10 to 60. In some further related embodiments, o is 20 to 60. In other further related embodiments, o is 25 to 50. In other further related embodiments, o is 30 to 45. In other further related embodiments, o is 35 to 40. In other further related embodiments, o is more than 15, 25 or 30. $L^1$, $L^2$, $L^3$, $L^4$, $R^2$, $R^3$, $R^4$ and $R^5$ may be any of the embodiments described above (e.g. $L^2$, $L^3$, and $L^4$ may be independently unsubstituted $C_1$-$C_3$ alkylene (e.g. methylene or ethylene), $L^1$ may be substituted $C_3$ alkylene (e.g. the compound of formula (V)), $R^2$, $R^3$, and $R^4$ may be independently —OH or —C(O)OH, and $R^5$ may be independently hydrogen or unsubstituted $C_1$-$C_3$ alkyl).

In some embodiments, p is 15 to 100. In some related embodiments, p is 15 to 90. In some related embodiments, p is 15 to 80. In some related embodiments, p is 15 to 70. In some related embodiments, p is 15 to 60. In some further related embodiments, o is 20 to 60. In other further related embodiments, o is 25 to 50. In other further related embodiments, o is 30 to 45. In other further related embodiments, o is 35 to 40. In other further related embodiments, o is more than 15, 20 or 30. $L^1$, $L^2$, $L^3$, $L^4$, $R^2$, $R^3$, $R^4$ and $R^5$ may be any of the embodiments described above (e.g. $L^2$, $L^3$, and $L^4$ may be independently unsubstituted $C_1$-$C_3$ alkylene (e.g. methylene or ethylene), $L^1$ may be substituted $C_3$ alkylene (e.g. the compound of formula (V)), $R^2$, $R^3$, and $R^4$ may be independently —OH or —C(O)OH, and $R^5$ may be independently hydrogen or unsubstituted $C_1$-$C_3$ alkyl).

In some embodiments, the compound provided herein has the formula:

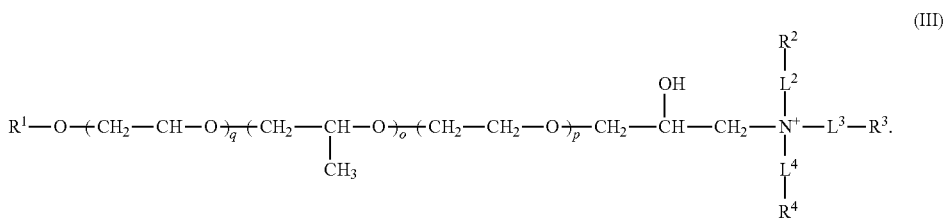

(III)

In formula (III) p is an integer from 10 to 100, o is an integer from 20 to 80, q is an integer from 0 to 60, and $R^5$ is unsubstituted $C_1$-$C_3$ alkyl. In some further embodiments, $R^5$ is ethyl or propyl. In some further embodiments, $R^5$ is ethyl.

In some embodiments, p is 10 to 100. In some related embodiments, p is 10 to 90. In some related embodiments, p is 10 to 80. In some related embodiments, p is 10 to 70. In some related embodiments, p is 10 to 60. In some further related embodiments, o is 20 to 60. In other further related embodiments, o is 25 to 50. In other further related embodiments, o is 30 to 45. In other further related embodiments, o is 35 to 40. In other further related embodiments, o is more than 15, 20 or 30. In other further embodiments, q is 0 to 50. In some other further embodiments, q is 5 to 50. In some other further embodiments, q is 10 to 50. In some other further embodiments, q is 15 to 50. In some other further embodiments, q is 20 to 50. In some other further embodiments, q is 25 to 50. $L^1$, $L^2$, $L^3$, $L^4$, $R^2$, $R^3$, $R^4$ and $R^5$ may be any of the embodiments described above (e.g. $L^2$, $L^3$, and $L^4$ may be independently unsubstituted $C_1$-$C_3$ alkylene (e.g. methylene or ethylene), $L^1$ may be substituted $C_3$ alkylene (e.g. the compound of formula (V)), $R^2$, $R^3$, and $R^4$ may be independently —OH or —C(O)OH, and $R^5$ may be independently hydrogen or unsubstituted $C_1$-$C_3$ alkyl).

In some embodiments, p is 15 to 100. In some related embodiments, p is 15 to 90. In some related embodiments, p is 15 to 80. In some related embodiments, p is 15 to 70. In some related embodiments, p is 15 to 60. In some further related embodiments, o is 5 to 60. In other further related embodiments, o is 10 to 50. In other further related embodiments, o is 15 to 45. In other further related embodiments, o is 20 to 40. In other further related embodiments, o is more than 10, 15, or 20. In other further embodiments, q is 0 to 50. In some other further embodiments, q is 5 to 50. In some other further embodiments, q is 10 to 50. In some other further embodiments, q is 15 to 50. In some other further embodiments, q is 20 to 50. In some other further embodiments, q is 25 to 50. $L^1$, $L^2$, $L^3$, $L^4$, $R^2$, $R^3$, $R^4$ and $R^5$ may be any of the embodiments described above (e.g. $L^2$, $L^3$, and $L^4$ may be independently unsubstituted $C_1$-$C_3$ alkylene (e.g. methylene or ethylene), $L^1$ may be substituted $C_3$ alkylene (e.g. the compound of formula (V)), $R^2$, $R^3$, and $R^4$ may be independently —OH or —C(O)OH, and $R^5$ may be independently hydrogen or unsubstituted $C_1$-$C_3$ alkyl).

In another aspect, an aqueous composition including a co-surfactant and a compound as described herein (e.g. a compound of formula (I), (II), or (III)) is provided. A co-surfactant, as used herein, is a compound within the aqueous composition that functions as a surface active agent when the aqueous composition is in contact with a crude oil (e.g. an unrefined petroleum). The co-surfactant, along with the compound of formula (I), (II) or (III), may act to lower the interfacial tension and/or surface tension of the unrefined petroleum. In some embodiments, the co-surfactant and the compound of formula (I), (II) or (III) are present in synergistic surface active amounts. A "synergistic surface active amount," as used herein, means that a compound of formula (I), (II) or (III) and the co-surfactant are present in amounts in which the oil surface activity (interfacial tension lowering effect and/or surface tension lowering effect on crude oil when the aqueous composition is added to the crude oil) of the compound and co-surfactant combined is greater than the additive oil surface activity of the co-surfactant individually and the compound individually. In some cases, the oil surface activity of the compound and co-surfactant combination is 10%, 20%, 30%, 40%, 50%, 60%, 70%, 80%, 90% or 100% more than the additive oil surface activity of the co-surfactant individually and the compound individually. In some embodiments, the oil surface activity of the compound and co-surfactant combination is 2, 3, 4, 5, 6, 7, 8, 9 or 10 times more than the additive oil surface activity of the co-surfactant individually and the compound individually.

In another embodiment, the compound and co-surfactant are present in a surfactant stabilizing amount. A "surfactant stabilizing amount" means that the compound and the co-surfactant are present in an amount in which the co-surfactant degrades at a slower rate in the presence of the compound than in the absence of the compound, and/or the compound degrades at a slower rate in the presence of the co-surfactant than in the absence of the co-surfactant. The rate of degradation may be 10%, 20%, 30%, 40%, 50%, 60%, 70%, 80%, 90% or 100% slower. In some embodiments, the rate of degradation is 2, 3, 4, 5, 6, 7, 8, 9 or 10 times slower.

In another embodiment, the compound and co-surfactant are present in a synergistic solubilizing amount. A "synergistic solubilizing amount" means that the compound and the co-surfactant are present in an amount in which the compound is more soluble in the presence of the co-surfactant than in the absence of the co-surfactant, and/or the co-surfactant is more soluble in the presence of the compound than in the absence of the compound. The solubilization may be 10%, 20%, 30%, 40%, 50%, 60%, 70%, 80%, 90% or 100% higher. In some embodiment, the solubilization is 2, 3, 4, 5, 6, 7, 8, 9 or 10 times higher. In some embodiments, the compound is present in an amount sufficient to increase the solubility of the co-surfactant in the aqueous composition relative to the absence of the compound. In other words, in the presence of a sufficient amount of the compound, the solubility of the co-surfactant in the aqueous composition is higher than in the absence of the compound. In other embodiments, the co-surfactant is present in an amount sufficient to increase the solubility of the compound in the aqueous composition relative to the absence of the co-surfactant. Thus, in the presence of a sufficient amount of the co-surfactant the solubility of the compound in the aqueous solution is higher than in the absence of the co-surfactant.

The aqueous composition provided herein including embodiments thereof includes a co-surfactant. The co-surfactant provided herein may be any appropriate co-surfactant useful in the field of enhanced oil recovery. In other embodiments, a plurality of co-surfactant types is in the aqueous composition. In some embodiments, the co-surfactant is a single co-surfactant type in the aqueous composition. In other embodiments, the aqueous composition includes a plurality of different co-surfactants. Where the aqueous composition includes a plurality of different co-surfactants the aqueous composition may include a co-surfactant blend. A "co-surfactant blend" as provided herein is a mixture of a plurality of co-surfactant types. In some embodiments, the co-surfactant blend includes a first co-surfactant type (e.g. an alkoxy carboxylate surfactant), a second surfactant type (e.g. an internal olefin sulfonate) or a third co-surfactant type (sulfate surfactant). The first, second and third co-surfactant type may be independently different (e.g. anionic or cationic co-surfactants; or two anionic co-surfactants having a different hydrocarbon chain length but are otherwise the same). Therefore, a person having ordinary skill in the art will immediately recognize that the terms "co-surfactant" and "co-surfactant type(s)" have the same meaning and can be used interchangeably. In some embodiments, the plurality of different co-surfactants includes an anionic co-surfactant, a non-ionic co-surfactant, a zwitterionic co-surfactant or a cationic co-surfactant. In some embodiments, the co-surfactant is an anionic surfactant, a non-ionic surfactant, a zwitterionic co-surfactant. "Zwitterionic" or "zwitterion" as used herein refers to a neutral molecule with a positive (or cationic) and a negative (or anionic) electrical charge at different locations within the same molecule. Examples for zwitterionics are without limitation betains and sultains.

The co-surfactant provided herein may be any appropriate anionic co-surfactant. In some embodiments, the co-surfactant is an anionic co-surfactant. In some embodiments, the anionic co-surfactant is an anionic co-surfactant blend. Where the anionic co-surfactant is an anionic co-surfactant blend the aqueous composition includes a plurality (i.e. more than one) of anionic co-surfactant types. In some embodiments, the anionic co-surfactant is an alkoxy carboxylate co-surfactant, an alkoxy sulfate co-surfactant, an alkoxy sulfonate co-surfactant, an alkyl sulfonate co-surfactant, an aryl sulfonate co-surfactant or an olefin sulfonate co-surfactant. An "alkoxy carboxylate co-surfactant" as provided herein is a compound having an alkyl or aryl attached to one or more alkoxylene groups (typically —CH$_2$—CH(ethyl)-O—, —CH$_2$—CH(methyl)-O—, or —CH$_2$—CH$_2$—O—) which, in turn is attached to —COO$^-$ or acid or salt thereof including metal cations such as sodium. In some embodiments, the alkoxy carboxylate co-surfactant has the formula:

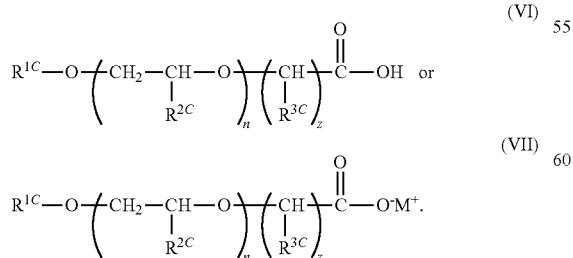

In formula (VI) or (VII) $R^{1C}$ is substituted or unsubstituted $C_8$-$C_{150}$ alkyl or substituted or unsubstituted aryl, $R^{2C}$ is independently hydrogen or unsubstituted $C_1$-$C_6$ alkyl, $R^{1C}$ is independently hydrogen or unsubstituted $C_1$-$C_6$ alkyl, n is an integer from 2 to 210, z is an integer from 1 to 6 and $M^+$ is a monovalent, divalent or trivalent cation. In some embodiments, $R^{1C}$ is unsubstituted linear or branched $C_8$-$C_{36}$ alkyl. In some embodiments, $R^{1C}$ is ($C_6H_5$—$CH_2CH_2$)$_3C_6H_2$-(TSP), ($C_6H_5$—$CH_2CH_2$)$_2C_6H_3$-(DSP), ($C_6H_5$—$CH_2CH_2$)$_1C_6H_4$-(MSP), or substituted or unsubstituted naphthyl. In some embodiments, the alkoxy carboxylate is $C_{28}$-25PO-25EO-carboxylate (i.e. unsubstituted $C_{28}$ alkyl attached to 25 —CH$_2$—CH(methyl)-O— linkers, attached in turn to 25 —CH$_2$—CH$_2$—O— linkers, attached in turn to —COO$^-$ or acid or salt thereof including metal cations such as sodium).

In some embodiments, the co-surfactant is an alkoxy sulfate co-surfactant. An alkoxy sulfate co-surfactant as provided herein is a co-surfactant having an alkyl or aryl attached to one or more alkoxylene groups (typically —CH$_2$—CH(ethyl)-O—, —CH$_2$—CH(methyl)-O—, or —CH$_2$—CH$_2$—O—) which, in turn is attached to —SO$_3^-$ or acid or salt thereof including metal cations such as sodium. In some embodiment, the alkoxy sulfate co-surfactant has the formula $R^A$—(BO)$_e$—(PO)$_f$-(EO)$_g$—SO$_3^-$ or acid or salt (including metal cations such as sodium) thereof, wherein $R^A$ is $C_8$-$C_{30}$ alkyl, BO is —CH$_2$—CH(ethyl)-O—, PO is —CH$_2$—CH(methyl)-O—, and EO is —CH$_2$—CH$_2$—O—. The symbols e, f and g are integers from 0 to 25 wherein at least one is not zero. In some embodiment, the alkoxy sulfate co-surfactant is $C_{15}$-13PO-sulfate (i.e. an unsubstituted $C_{15}$ alkyl attached to 13 —CH$_2$—CH(methyl)-O— linkers, in turn attached to —SO$_3^-$ or acid or salt thereof including metal cations such as sodium).

In other embodiments, the alkoxy sulfate co-surfactant has the formula

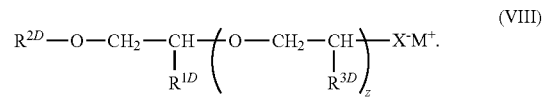

In formula (VIII) $R^{1D}$ and $R^{2D}$ are independently substituted or unsubstituted $C_8$-$C_{150}$ alkyl or substituted or unsubstituted aryl. $R^{3D}$ is independently hydrogen or unsubstituted $C_1$-$C_6$ alkyl. z is an integer from 2 to 210. $X^-$ is

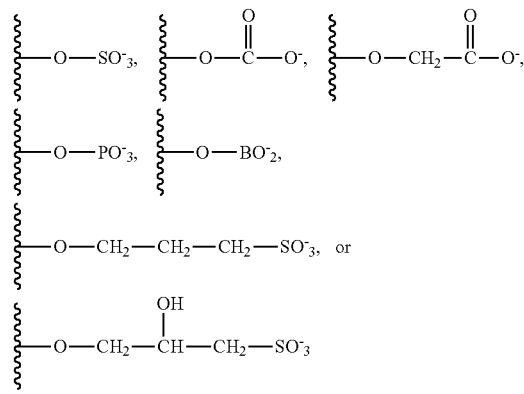

and $M^+$ is a monovalent, divalent or trivalent cation. In some embodiments, $R^{1D}$ is branched unsubstituted $C_8$-$C_{150}$. In other embodiments, $R^{1D}$ is branched or linear unsubstituted $C_{12}$-$C_{100}$ alkyl, ($C_6H_5$—$CH_2CH_2$)$_3C_6H_2$-(TSP), ($C_6H_5$—

$CH_2CH_2)_2C_6H_3$-(DSP), $(C_6H_5—CH_2CH_2)_1C_6H_4$-(MSP), or substituted or unsubstituted naphthyl. In some embodiments, the alkoxy sulfate is $C_{16}$-$C_{16}$-epoxide-15PO-10EO-sulfate (i.e. a linear unsubstituted $C_{16}$ alkyl attached to an oxygen, which in turn is attached to a branched unsubstituted $C_{16}$ alkyl, which in turn is attached to 15 —$CH_2$—CH(methyl)-O— linkers, in turn attached to 10 —$CH_2$—$CH_2$—O— linkers, in turn attached to —$SO_3^-$ or acid or salt thereof including metal cations such as sodium.

The alkoxy sulfate co-surfactant provided herein may be an aryl alkoxy sulfate co-surfactant. An aryl alkoxy co-surfactant as provided herein is an alkoxy co-surfactant having an aryl attached to one or more alkoxylene groups (typically —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium. In some embodiments, the aryl alkoxy sulfate co-surfactant is $(C_6H_5$—$CH_2CH_2)_3C_6H_2$-7PO-10EO-sulfate (i.e. tri-styrylphenol attached to 7 —$CH_2$—CH(methyl)-O— linkers, in turn attached to 10 —$CH_2$—$CH_2$—O— linkers, in turn attached to —$SO_3^-$ or acid or salt thereof including metal cations such as sodium).

In some embodiments, the co-surfactant is an unsubstituted alkyl sulfate or an unsubstituted alkyl sulfonate co-surfactant. An alkyl sulfate co-surfactant as provided herein is a co-surfactant having an alkyl group attached to —O—$SO_3^-$ or acid or salt thereof including metal cations such as sodium. An alkyl sulfonate co-surfactant as provided herein is a co-surfactant having an alkyl group attached to —$SO_3^-$ or acid or salt thereof including metal cations such as sodium. In some embodiments, the co-surfactant is an unsubstituted aryl sulfate co-surfactant or an unsubstituted aryl sulfonate co-surfactant. An aryl sulfate co-surfactant as provided herein is a co-surfactant having an aryl group attached to —O—$SO_3^-$ or acid or salt thereof including metal cations such as sodium. An aryl sulfonate co-surfactant as provided herein is a co-surfactant having an aryl group attached to —$SO_3^-$ or acid or salt thereof including metal cations such as sodium. In some embodiments, the co-surfactant is an alkyl aryl sulfonate. Non-limiting examples of alkyl sulfate co-surfactants, aryl sulfate co-surfactants, alkyl sulfonate co-surfactants, aryl sulfonate co-surfactants and alkyl aryl sulfonate co-surfactants useful in the embodiments provided herein are alkyl aryl sulfonates (ARS) (e.g. alkyl benzene sulfonate (ABS)), alkane sulfonates, petroleum sulfonates, and alkyl diphenyl oxide (di)sulfonates. Additional co-surfactants useful in the embodiments provided herein are alcohol sulfates, alcohol phosphates, alkoxy phosphate, sulfosuccinate esters, alcohol ethoxylates, alkyl phenol ethoxylates, quaternary ammonium salts, betains and sultains.

The co-surfactant as provided herein may be a combination of one or more anionic, non-ionic, cationic or zwitterionic co-surfactants. In some embodiments, the co-surfactant is an internal olefin sulfonate (IOS), an alfa olefin sulfonate (AOS), an alkyl aryl sulfonate (ARS), an alkane sulfonate, a petroleum sulfonate, an alkyl diphenyl oxide (di)sulfonate, an alcohol sulfate, an alkoxy sulfate, an alkoxy sulfonate, an alcohol phosphate, an alkoxy phosphate, a sulfosuccinate ester, an alcohol ethoxylate, an alkyl phenol ethoxylate, a quaternary ammonium salt, a betaine or sultaine. The co-surfactant as provided herein, may also be a soap.

Without limitation, the co-surfactant may be a combination of two or more of the following compounds: an internal olefin sulfonate (IOS), an alfa olefin sulfonate (AOS), an alkyl aryl sulfonate (ARS) (e.g. an alkyl benzene sulfonate (ABS)), an alkane sulfonate, a petroleum sulfonate, an alkyl diphenyl oxide (di)sulfonate, an alcohol sulfate, an alkoxy sulfate (e.g. an alkyl alkoxy sulfate) an alkoxy sulfonate, an alcohol phosphate, an alkoxy phosphate, a sulfosuccinate ester, an alcohol ethoxylate, an alkyl phenol ethoxylate, a quaternary ammonium salt, a betaine, a sultaine and a soap (or its carboxylic acid). A person having ordinary skill in the art will immediately recognize that many surfactants are commercially available as blends of related molecules (e.g. IOS and ABS surfactants). Thus, where a co-surfactant is present within a composition provided herein, a person of ordinary skill would understand that the co-surfactant may be a blend of a plurality of related surfactant molecules (as described herein and as generally known in the art). In some embodiments, the co-surfactant is a $C_{10}$-$C_{30}$ internal olefin sulfate (IOS) or a $C_8$-$C_{30}$ alkyl benzene sulfonate (ABS). In other embodiments, the co-surfactant is a combination of a $C_{10}$-$C_{30}$ internal olefin sulfate (IOS) and a $C_8$-$C_{30}$ alkyl benzene sulfonate (ABS). In some embodiments, the $C_{10}$-$C_{30}$ of IOS is a branched unsubstituted $C_{10}$-$C_{30}$ saturated alkyl. In some embodiment, the IOS is a $C_{15}$-$C_{18}$ internal olefin sulfate. In some embodiment, the IOS is a $C_{19}$-$C_{23}$ internal olefin sulfate. In some embodiment, the IOS is a $C_{20}$-$C_{24}$ internal olefin sulfate. In some embodiment, the IOS is a $C_{15}$-$C_{18}$ internal olefin sulfate. In other embodiments, the $C_8$-$C_{30}$ of ABS is a branched unsubstituted $C_8$-$C_{30}$ saturated alkyl.

In some embodiments, the surfactant is an unsubstituted alkyl alkoxy sulfate having an alkyl attached to one or more alkoxylene groups (typically —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium. In some embodiment, the alkyl alkoxy sulfate has the formula $R^4$—$(BO)_e$—$(PO)_f$—$(EO)_g$—$SO_3^-$ or acid or salt (including metal cations such as sodium) thereof, wherein BO is —$CH_2$—CH(ethyl)-O—, PO is —$CH_2$—CH(methyl)-O—, and —$CH_2$—$CH_2$—O—. The symbols e, f and g are integers from 0 to 25 wherein at least one is not zero. In some embodiment, the alkyl alkoxy sulfate is $C_{15}$-13PO-Sulfate (i.e. an unsubstituted $C_{15}$ alkyl attached to 13 —$CH_2$—CH(methyl)-O— linkers, in turn attached to —$SO_3^-$ or acid or salt thereof including metal cations such as sodium. In some embodiments, the surfactant is an unsubstituted alkyl sulfate.

Useful co-surfactants are disclosed, for example, in U.S. Pat. Nos. 3,811,504, 3,811,505, 3,811,507, 3,890,239, 4,463,806, 6,022,843, 6,225,267, 7,629,299; WIPO Patent Application WO/2008/079855 and WO/2012/027757, as well as U.S. Patent Application Nos. 2005/0199395, 2006/0185845, 2006/018486, 2009/0270281, 2011/0046024, 2011/0100402, 2011/0190175, 2007/0191633, 2010/004843. 2011/0201531, 2011/0190174, 2011/0071057, 2011/0059873, 2011/0059872, 2011/0048721, 2010/0319920, and 2010/0292110. Additional useful co-surfactants are surfactants known to be used in enhanced oil recovery methods, including those discussed in D. B. Levitt, A. C. Jackson, L. Britton and G. A. Pope, "Identification and Evaluation of High-Performance EOR Surfactants," SPE 100089, conference contribution for the SPE Symposium on Improved Oil Recovery Annual Meeting, Tulsa, Okla., Apr. 24-26, 2006.

In some embodiment, the total surfactant concentration (i.e. the compound of formula (I), (II) or (III) and one or more co-surfactants) in the aqueous composition is from about 0.05% w/w to about 10% w/w. In other embodiments, the total surfactant concentration in the aqueous composition is from about 0.25% to about 10%. In other embodiments, the total surfactant concentration in the aqueous composition is about 0.5%. In other embodiments, the total surfactant concentration in the aqueous composition is about 1.0%. In other embodiments, the total surfactant concentration in the aqueous composition is from about 1.25%. In other embodiments, the total surfactant concentration in the aqueous composition is from about 1.5%. In other embodiments, the total surfactant concentration in the aqueous composition is from about 1.75%. In other embodiments, the total surfactant concentration in the aqueous composition is from about 2.0%. In other embodiments, the total surfactant concentration in the aqueous composition is from about 2.5%. In other embodiments, the total surfactant concentration in the aqueous composition is from about 3.0%. In other embodiments, the total surfactant concentration in the aqueous composition is from about 3.5%. In other embodiments, the total surfactant concentration in the aqueous composition is from about 4.0%. In other embodiments, the total surfactant concentration in the aqueous composition is from about 4.5%. In other embodiments, the total surfactant concentration in the aqueous composition is from about 5.0%. In other embodiments, the total surfactant concentration in the aqueous composition is from about 5.5%. In other embodiments, the total surfactant concentration in the aqueous composition is from about 6.0%. In other embodiments, the total surfactant concentration in the aqueous composition is from about 6.5%. In other embodiments, the total surfactant concentration in the aqueous composition is from about 7.0%. In other embodiments, the total surfactant concentration in the aqueous composition is from about 7.5%. In other embodiments, the total surfactant concentration in the aqueous composition is from about 8.0%. In other embodiments, the total surfactant concentration in the aqueous composition is from about 9.0%. In other embodiments, the total surfactant concentration in the aqueous composition is from about 10%.

In some embodiments, the concentration of the compound of formula (I), (II) or (III) is about 0.05% (all percentages of the compounds of formula (I), (II) or (III), so-solvents and co-surfactants within the aqueous compositions and emulsion compositions here are w/w percentages). In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.1%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.15%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.20%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.25%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.30%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.35%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.40%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentra-tion of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.45%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.50%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.55%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.60%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.65%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.70%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.75%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.80%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.85%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.90%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 0.95%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 1.0%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 1.25%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 1.50%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 1.75%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 2%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 3%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 4%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I), (II) or (III) is about 5%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In one embodiment, the aqueous composition further includes a viscosity enhancing water-soluble polymer. In one embodiment, the viscosity enhancing water-soluble polymer may be a biopolymer such as xanthan gum or scleroglucan, a synthetic polymer such as polyacrylamide, hydrolyzed polyacrylamide or co-polymers of acrylamide and acrylic acid, 2-acrylamido 2-methyl propane sulfonate or N-vinyl pyrrolidone, a synthetic polymer such as polyethylene oxide, or any other high molecular weight polymer soluble in water or brine. In one embodiment, the viscosity enhancing water-soluble polymer is polyacrylamide or a co-polymer of polyacrylamide. In one embodiment, the viscosity enhancing water-soluble polymer is a partially (e.g. 20%, 25%, 30%, 35%, 40%, 45%) hydrolyzed anionic polyacrylamide. In some further embodiment, the viscosity enhancing water-soluble polymer has a molecular weight of approximately about $8 \times 10^6$. In some other further embodiment, the viscosity enhancing water-soluble polymer has a molecular weight of approximately about $18 \times 10^6$. Non-limiting examples of commercially available polymers useful for the invention including embodiments provided herein are Florpaam 3330S and Florpaam 3360S. Molecular weights of the polymers may range from about 10,000 daltons to about 20,000,000 daltons. In some embodiments, the viscosity enhancing water-soluble polymer is used in the range of about 500 to about 5000 ppm concentration, such as from about 1000 to 2000 ppm (e.g. in order to match or exceed the reservoir oil viscosity under the reservoir conditions of temperature and pressure).

In some embodiments, the aqueous composition further includes an alkali agent. An alkali agent as provided herein is a basic, ionic salt of an alkali metal (e.g. lithium, sodium, potassium) or alkaline earth metal element (e.g. magnesium, calcium, barium, radium). In some embodiments, the alkali agent is NaOH, KOH, LiOH, $Na_2CO_3$, $NaHCO_3$, Na-metaborate, Na silicate, Na orthosilicate, Na acetate or $NH_4OH$. The aqueous composition may include seawater, or fresh water from an aquifer, river or lake. In some embodiments, the aqueous composition includes hard brine water or soft brine water. In some further embodiments, the water is soft brine water. In some further embodiments, the water is hard brine water. Where the aqueous composition includes soft brine water, the aqueous composition may include an alkaline agent. In soft brine water the alkaline agent provides for enhanced soap generation from the active oils, lower surfactant adsorption to the solid material (e.g. rock) in the reservoir and increased solubility of viscosity enhancing water soluble polymers. The alkali agent is present in the aqueous composition at a concentration from about 0.1% w/w to about 10% w/w. The combined amount of alkali agent and compound provided herein (e.g. compound of formula (I) or (II)) present in the aqueous composition provided herein is approximately equal to or less than about 10% w/w. In some embodiments, the total concentration of alkali agent (i.e. the total amount of alkali agent within the aqueous compositions and emulsion compositions provided herein) in is from about 0.05% w/w to about 5% w/w. In other embodiments, the total alkali agent concentration in the aqueous composition is from about 0.25% w/w to about 5% w/w. In other embodiments, the total alkali agent concentration in the aqueous composition is about 0.5% w/w.

In other embodiments, the total alkali agent concentration in the aqueous composition is about 0.75% w/w. In other embodiments, the total alkali agent concentration in the aqueous composition is about 1% w/w. In other embodiments, the total alkali agent concentration in the aqueous composition is about 1.25% w/w. In other embodiments, the total alkali agent concentration in the aqueous composition is about 1.50% w/w. In other embodiments, the total alkali agent concentration in the aqueous composition is about 1.75% w/w. In other embodiments, the total alkali agent concentration in the aqueous composition is about 2% w/w. In other embodiments, the total alkali agent concentration in the aqueous composition is about 2.25% w/w. In other embodiments, the total alkali agent concentration in the aqueous composition is about 2.5% w/w. In other embodiments, the total alkali agent concentration in the aqueous composition is about 2.75% w/w. In other embodiments, the total alkali agent concentration in the aqueous composition is about 3% w/w. In other embodiments, the total alkali agent concentration in the aqueous composition is about 3.25% w/w. In other embodiments, the total alkali agent concentration in the aqueous composition is about 3.5% w/w. In other embodiments, the total alkali agent concentration in the aqueous composition is about 3.75% w/w. In other embodiments, the total alkali agent concentration in the aqueous composition is about 4% w/w. In other embodiments, the total alkali agent concentration in the aqueous composition is about 4.25% w/w. In other embodiments, the total alkali agent concentration in the aqueous composition is about 4.5% w/w. In other embodiments, the total alkali agent concentration in the aqueous composition is about 4.75% w/w. In other embodiments, the total alkali agent concentration in the aqueous composition is about 5.0% w/w.

The aqueous composition may include a surfactant, a co-surfactant and a co-solvent. Thus, in some embodiments, the aqueous composition includes a co-solvent. In some embodiments, the co-solvent is TEGBE (triethylene glycol mono butyl ether). In some embodiments, TEGBE is present at a concentration from about 0.01% to about 2%. In some embodiments, TEGBE is present at a concentration from about 0.05% to about 1.5%. In some embodiments, TEGBE is present at a concentration from about 0.2% to about 1.25%. In some embodiments, TEGBE is present at a concentration from about 0.25% to about 1%. In some embodiments, TEGBE is present at a concentration from about 0.5% to about 0.75%. In some embodiments, TEGBE is present at a concentration of about 0.25%. In other embodiments, TEGBE is present at a concentration of about 1%. In some embodiments, the co-solvent is an alcohol, alcohol ethoxylate, glycol ether, glycols, or glycerol.

In some embodiments, the co-solvent has the formula

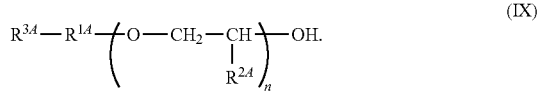

In formula (IX), $R^{1A}$ is unsubstituted $C_1$-$C_6$ alkylene, unsubstituted phenylene, unsubstituted cyclohexylene, unsubstituted cyclopentylene or methyl-substituted cyclopentylene. $R^{2A}$ is independently hydrogen, methyl or ethyl. $R^{3A}$ is independently hydrogen or

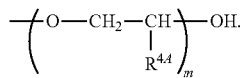

$R^{4A}$ is independently hydrogen, methyl or ethyl, n is an integer from 0 to 30, and m is an integer from 0 to 30. In one embodiment, n is an integer from 0 to 25. In one embodiment, n is an integer from 0 to 20. In one embodiment, n is an integer from 0 to 15. In one embodiment, n is an integer from 0 to 10. In one embodiment, n is an integer from 0 to 5. In one embodiment, n is 1. In other embodiments, n is 3. In one embodiment, n is 5. In one embodiment, m is an integer from 0 to 25. In one embodiment, m is an integer from 0 to 20. In one embodiment, m is an integer from 0 to 15. In one embodiment, m is an integer from 0 to 10. In one embodiment, m is an integer from 0 to 5. In one embodiment, m is 1. In other embodiments, m is 3. In one embodiment, m is 5. In formula (IX) each of $R^{2A}$ and $R^{4A}$ can appear more than once and can be optionally different. For example, in one embodiment where n is 2, $R^{2A}$ appears twice and can be optionally different. In other embodiments, where m is 3, $R^{4A}$ appears three times and can be optionally different.

$R^{1A}$ may be linear or branched unsubstituted alkylene. In one embodiment, $R^{1A}$ of formula (IX) is linear unsubstituted $C_1$-$C_6$ alkylene. In one embodiment, $R^{1A}$ of formula (IX) is branched unsubstituted $C_1$-$C_6$ alkylene. In other embodiments, $R^{1A}$ of formula (IX) is linear unsubstituted $C_2$-$C_6$ alkylene. In other embodiments, $R^{1A}$ of formula (IX) is branched unsubstituted $C_2$-$C_6$ alkylene. In other embodiments, $R^{1A}$ of formula (IX) is linear unsubstituted $C_3$-$C_6$ alkylene. In other embodiments, $R^{1A}$ of formula (IX) is branched unsubstituted $C_3$-$C_6$ alkylene. In other embodiments, $R^{1A}$ of formula (IX) is linear unsubstituted $C_4$-$C_6$ alkylene. In other embodiments, $R^{1A}$ of formula (IX) is branched unsubstituted $C_4$-$C_6$ alkylene. In other embodiments, $R^{1A}$ of formula (IX) is linear unsubstituted $C_4$-alkylene. In other embodiments, $R^{1A}$ of formula (IX) is branched unsubstituted $C_4$-alkylene.

In one embodiment, where $R^{1A}$ is linear or branched unsubstituted alkylene (e.g. branched unsubstituted $C_1$-$C_6$ alkylene), the alkylene is a saturated alkylene (e.g. a linear or branched unsubstituted saturated alkylene or branched unsubstituted $C_1$-$C_6$ saturated alkylene). A "saturated alkylene," as used herein, refers to an alkylene consisting only of hydrogen and carbon atoms that are bonded exclusively by single bonds. Thus, in one embodiment, $R^{1A}$ is linear or branched unsubstituted saturated alkylene. In one embodiment, $R^{1A}$ of formula (IX) is linear unsubstituted saturated $C_1$-$C_6$ alkylene. In one embodiment, $R^{1A}$ of formula (IX) is branched unsubstituted saturated $C_1$-$C_6$ alkylene. In other embodiments, $R^{1A}$ of formula (IX) is linear unsubstituted saturated $C_2$-$C_6$ alkylene. In other embodiments, $R^{1A}$ of formula (IX) is branched unsubstituted saturated $C_2$-$C_6$ alkylene. In other embodiments, $R^{1A}$ of formula (IX) is linear unsubstituted saturated $C_3$-$C_6$ alkylene. In other embodiments, $R^{1A}$ of formula (IX) is branched unsubstituted saturated $C_3$-$C_6$ alkylene. In other embodiments, $R^{1A}$ of formula (IX) is linear unsubstituted saturated $C_4$-$C_6$ alkylene. In other embodiments, $R^{1A}$ of formula (IX) is branched unsubstituted saturated $C_4$-$C_6$ alkylene. In other embodiments, $R^{1A}$ of formula (IX) is linear unsubstituted saturated $C_4$-alkylene. In other embodiments, $R^{1A}$ of formula (IX) is branched unsubstituted saturated $C_4$-alkylene.

In one embodiment, $R^{1A}$ of formula (IX) is substituted or unsubstituted cycloalkylene or unsubstituted arylene. In one embodiment, $R^{1A}$ of formula (IX) is $R^{7A}$-substituted or unsubstituted cyclopropylene, wherein $R^{7A}$ is $C_1$-$C_3$ alkyl. In other embodiments, $R^{1A}$ of formula (IX) is $R^{8A}$-substituted or unsubstituted cyclobutylene, wherein $R^{8A}$ is $C_1$-$C_2$ alkyl. In other embodiments, $R^{1A}$ of formula (IX) is $R^{9A}$-substituted or unsubstituted cyclopentylene, wherein $R^{9A}$ is $C_1$-alkyl. In other embodiments, $R^{1A}$ of formula (IX) is $R^{10A}$-substituted or unsubstituted cyclopentylene, wherein $R^{10A}$ is unsubstituted cyclohexyl. In one embodiment, $R^{1A}$ of formula (IX) is unsubstituted phenylene, unsubstituted cyclohexylene, unsubstituted cyclopentylene or methyl-substituted cyclopentylene.

In one embodiment, —$R^{1A}$—$R^{3A}$ of formula (IX) is $C_1$-$C_6$ alkyl, unsubstituted phenyl, unsubstituted cyclohexyl, unsubstituted cyclopentyl or a methyl-substituted cycloalkyl.

In one embodiment, the co-solvent has the structure of formula

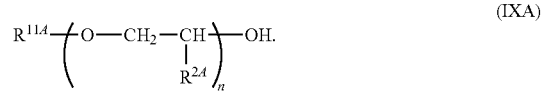

In formula (IXA), $R^{11A}$ is $C_1$-$C_6$ alkyl, unsubstituted phenyl, unsubstituted cyclohexyl, unsubstituted cyclopentyl or a methyl-substituted cycloalkyl.

In one embodiment, n and m are independently 1 to 20. In other embodiments, n and m are independently 1 to 15. In other embodiments, n and m are independently 1 to 10. In one embodiment, n and m are independently 1 to 6. In one embodiment, n and m are independently 1.

The co-solvent included in the aqueous compositions provided herein may be a monohydric or a dihydric alkoxy alcohol (e.g. $C_1$-$C_6$ alkoxy alcohol or $C_1$-$C_6$ alkoxy diol).

Where the co-solvent is a monohydric alcohol, the co-solvent has the formula (IX) and $R^{3A}$ is hydrogen. Where the co-solvent is a diol, the co-solvent has the formula (IX) and $R^{3A}$ is

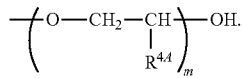

In one embodiment, $R^{1A}$ is linear unsubstituted $C_4$ alkylene and n is 3. In one embodiment, the co-solvent is triethyleneglycol butyl ether. In other embodiments, the co-solvent is tetraethylene glycol. In further embodiments, m is 3. In one embodiment, $R^{1A}$ is linear unsubstituted $C_4$ alkylene and n is 5. In one embodiment, the co-solvent is pentaethyleneglycol n-butyl ether. In further embodiments, m is 5. In one embodiment, $R^{1A}$ is branched unsubstituted $C_4$ alkylene and n is 1. In one embodiment, the co-solvent is ethyleneglycol iso-butyl ether. In further embodiments, m is 1. In one embodiment, $R^{1A}$ is branched unsubstituted $C_4$ alkylene and n is 3. In one embodiment, the co-solvent is triethyleneglycol iso-butyl ether. In further embodiments, m is 3. In one embodiment, the co-solvent is ethylene glycol or propylene glycol. In other embodiments, the co-solvent is ethylene glycol alkoxylate or propylene glycol alkoxylate. In one embodiment, the co-solvent is propylene glycol diethoxylate or propylene glycol-triethoxylate. In one embodiment, the co-solvent is propylene glycol tetraethoxylate.

In the structure of formula (IX), $R^{3A}$ may be hydrogen or

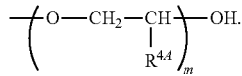

Thus in one embodiment, $R^{3A}$ is

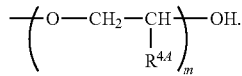

In one embodiment, the co-solvent provided herein may be an alcohol or diol ($C_1$-$C_6$ alcohol or $C_1$-$C_6$ diol). Where the co-solvent is an alcohol, the co-solvent has a structure of formula (I), where $R^{3A}$ is hydrogen and n is 0. Where the co-solvent is a diol, the co-solvent has a structure of formula (IX), where $R^{3A}$ is

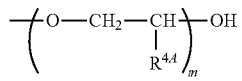

and n and m are 0. Thus, in one embodiment, n and m are independently 0. In one embodiment, $R^{1A}$ is linear or branched unsubstituted $C_1$-$C_6$ alkylene. In other embodiments, $R^{1A}$ is linear or branched unsubstituted $C_2$-$C_6$ alkylene. In one embodiment, $R^{1A}$ is linear or branched unsubstituted $C_2$-$C_6$ alkylene. In one embodiment $R^{1A}$ is linear or branched unsubstituted $C_3$-$C_6$ alkylene. In other embodiments, $R^{1A}$ is linear or branched unsubstituted $C_4$-$C_6$ alkylene. In one embodiment, $R^{1A}$ is linear or branched unsubstituted $C_4$-alkylene. In one embodiment, $R^{1A}$ is branched unsubstituted butylene. In one embodiment, the co-solvent has the structure of formula

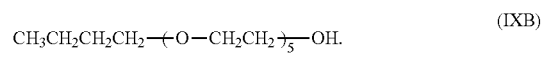

In other embodiments, the co-solvent has the structure of formula

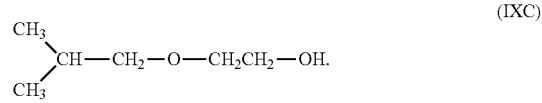

In one embodiment, the co-solvent has the structure of formula

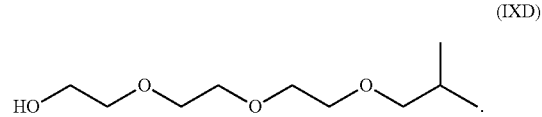

In some embodiments, the co-solvent has the formula

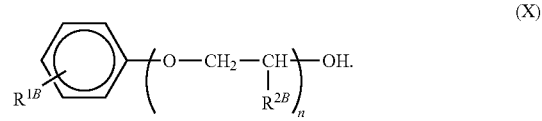

In formula (X) $R^{1B}$ is independently hydrogen or unsubstituted $C_1$-$C_6$ alkyl, $R^{2B}$ is independently hydrogen or unsubstituted $C_1$-$C_2$ alkyl and n is an integer from 1 to 30. In some embodiments, $R^{1B}$ is unsubstituted $C_2$-$C_6$ alkyl. In some embodiments, $R^{1B}$ is unsubstituted $C_4$-$C_6$ alkyl. In some embodiments, $R^{1B}$ is unsubstituted $C_1$-$C_5$ alkyl. In other embodiments, $R^{1B}$ is unsubstituted $C_1$-$C_4$ alkyl. In other embodiments, $R^{1B}$ is unsubstituted $C_1$-$C_3$ alkyl. In some embodiments, $R^{1B}$ is unsubstituted $C_1$-$C_2$ alkyl. In some embodiments, $R^{1B}$ is unsubstituted $C_2$ alkyl. In other embodiments, $R^{1B}$ is ethyl. In some embodiments, $R^{1B}$ is methyl. In some embodiment, $R^{1B}$ is hydrogen.

$R^{1B}$ may be linear or branched unsubstituted alkyl. In one embodiment, $R^{1B}$ of formula (X) is linear unsubstituted $C_1$-$C_6$ alkyl. In one embodiment, $R^{1B}$ of formula (X) is branched unsubstituted $C_1$-$C_6$ alkyl. In other embodiments, $R^{1B}$ of formula (X) is linear unsubstituted $C_1$-$C_5$ alkyl. In other embodiments, $R^{1B}$ of formula (X) is branched unsubstituted $C_1$-$C_5$ alkyl. In other embodiments, $R^{1B}$ of formula (X) is linear unsubstituted $C_1$-$C_4$ alkyl. In other embodiments, $R^{1B}$ of formula (X) is branched unsubstituted $C_1$-$C_4$ alkyl. In other embodiments, $R^{1B}$ of formula (X) is linear unsubstituted $C_1$-$C_3$ alkyl. In other embodiments, $R^{1B}$ of formula (X) is branched unsubstituted $C_1$-$C_3$ alkyl. In other embodiments, $R^{1B}$ of formula (X) is linear unsubstituted ethyl. In other embodiments, $R^{1B}$ of formula (X) is branched unsubstituted ethyl.

In one embodiment, where $R^{1B}$ is linear or branched unsubstituted alkyl (e.g. branched unsubstituted $C_1$-$C_6$ alkyl), the alkyl is a saturated alkyl (e.g. a linear or branched unsubstituted saturated alkyl or branched unsubstituted $C_1$-$C_6$ saturated alkyl). A "saturated alkyl," as used herein, refers to an alkyl consisting only of hydrogen and carbon atoms that are bonded exclusively by single bonds. Thus, in one embodiment, $R^{1B}$ is linear or branched unsubstituted saturated alkyl. In one embodiment, $R^{1B}$ of formula (X) is linear unsubstituted saturated $C_1$-$C_6$ alkyl. In one embodiment, $R^{1B}$ of formula (X) is branched unsubstituted saturated $C_1$-$C_6$ alkyl. In other embodiments, $R^{1B}$ of formula (X) is linear unsubstituted saturated $C_1$-$C_5$ alkyl. In other embodiments, $R^{1B}$ of formula (X) is branched unsubstituted saturated $C_1$-$C_5$ alkyl. In other embodiments, $R^{1B}$ of formula (X) is linear unsubstituted saturated $C_1$-$C_4$ alkyl. In other embodiments, $R^{1B}$ of formula (X) is branched unsubstituted saturated $C_1$-$C_4$ alkyl. In other embodiments, $R^{1B}$ of formula (X) is linear unsubstituted saturated $C_1$-$C_3$ alkyl. In other embodiments, $R^{1B}$ of formula (X) is branched unsubstituted saturated $C_1$-$C_3$ alkyl. In other embodiments, $R^{1B}$ of formula (X) is linear unsubstituted saturated ethyl. In other embodiments, $R^{1B}$ of formula (X) is branched unsubstituted saturated ethyl.

In formula (X) the symbol n is an integer from 1 to 30. In one embodiment, n is an integer from 1 to 25. In one embodiment, n is an integer from 1 to 20. In one embodiment, n is an integer from 1 to 15. In one embodiment, n is an integer from 1 to 10. In one embodiment, n is an integer from 1 to 5. In some embodiment, n is 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30. In one embodiment, n is 3. In other embodiments, n is 5. In one embodiment, n is 6. In one embodiment, n is 16.

In some embodiments, $R^{1B}$ is hydrogen. In other related embodiments, n is as defined in an embodiment above (e.g. n is at least 1, or at least 15, e.g. 5 to 20). Thus, in some embodiments, $R^{1B}$ is hydrogen and n is 16.

In some embodiments, $R^{1B}$ is methyl. In other related embodiments, n is as defined in an embodiment above (e.g. n is at least 1, or at least 10, e.g. 5 to 20). Thus, in some embodiments, $R^{1B}$ is methyl and n is 16.

In some embodiment, the co-solvent has the formula:

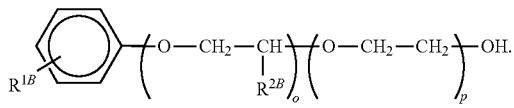

(XA)

In formula (XA) $R^{1B}$ is defined as above (e.g. unsubstituted $C_1$-$C_6$ alkyl), $R^{2B}$ is methyl or ethyl, o is an integer from 0 to 10 and p is an integer from 1 to 20. In some embodiments, $R^{2B}$ is methyl. In other embodiments, $R^{2B}$ is ethyl. In formula (XA) $R^{2B}$ can appear more than once and can be optionally different. For example, in some embodiments where o is 3, $R^{2B}$ appears three times and can be optionally different. In other embodiments, where o is 6, $R^{2B}$ appears 6 times and can be optionally different.

In some embodiments, o is 0 to 10. In some related embodiments, o is 0 to 8. In some related embodiments, o is 0 to 6. In some related embodiments, o is 0 to 4. In some related embodiments, o is 0 to 2. In still further related embodiments, o is 0. In some further related embodiment, p is 1 to 20. In some further related embodiment, p is 1 to 18. In some further related embodiment, p is 1 to 16. In some further related embodiment, p is 1 to 14. In some further related embodiment, p is 1 to 12. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. In some further embodiment, p is 6. In some further embodiment, p is 16. $R^1$ and $R^2$ may be any of the embodiments described above (e.g. $R^{1B}$ may be linear unsubstituted $C_1$-$C_6$ alkyl, $R^{2B}$ may be linear unsubstituted $C_1$-$C_2$ alkyl). Thus, in some embodiment, $R^{1B}$ is hydrogen, o is 0 and p is 16.

In some embodiments, o is 1 to 10. In some related embodiments, o is 1 to 8. In some related embodiments, o is 1 to 6. In some related embodiments, o is 1 to 4. In some related embodiments, o is 1 to 2. In some further related embodiment, p is 1 to 20. In some further related embodiment, p is 1 to 18. In some further related embodiment, p is 1 to 16. In some further related embodiment, p is 1 to 14. In some further related embodiment, p is 1 to 12. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1B}$ and $R^{2B}$ may be any of the embodiments described above (e.g. $R^{1B}$ may be linear unsubstituted $C_1$-$C_6$ alkyl, $R^{2B}$ may be linear unsubstituted $C_1$-$C_2$ alkyl).

In some embodiments, o is 2 to 10. In some related embodiments, o is 2 to 8. In some related embodiments, o is 2 to 6. In some related embodiments, o is 2 to 4. In some further related embodiment, p is 1 to 20. In some further related embodiment, p is 1 to 18. In some further related embodiment, p is 1 to 16. In some further related embodiment, p is 1 to 14. In some further related embodiment, p is 1 to 12. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1B}$ and $R^{2B}$ may be any of the embodiments described above (e.g. $R^{1B}$ may be linear unsubstituted $C_1$-$C_6$ alkyl, $R^{2B}$ may be linear unsubstituted $C_1$-$C_2$ alkyl).

In some embodiments, o is 4 to 10. In some related embodiments, o is 4 to 8. In some related embodiments, o is 4 to 6. In some further related embodiment, p is 1 to 20. In some further related embodiment, p is 1 to 18. In some further related embodiment, p is 1 to 16. In some further related embodiment, p is 1 to 14. In some further related embodiment, p is 1 to 12. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1B}$ and $R^{2B}$ may be any of the embodiments described above (e.g. $R^{1B}$ may be linear unsubstituted $C_1$-$C_6$ alkyl, $R^{2B}$ may be linear unsubstituted $C_1$-$C_2$ alkyl).

In some embodiments, o is 6 to 10. In some related embodiments, o is 6 to 8. In some further related embodiment, p is 1 to 20. In some further related embodiment, p is 1 to 18. In some further related embodiment, p is 1 to 16. In some further related embodiment, p is 1 to 14. In some further related embodiment, p is 1 to 12. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1B}$ and $R^{2B}$ may be any of the embodiments described above (e.g. $R^{1B}$ may be linear unsubstituted $C_1$-$C_6$ alkyl, $R^{2B}$ may be linear unsubstituted $C_1$-$C_2$ alkyl).

In some embodiments, o is 8 to 10. In some further related embodiment, p is 1 to 20. In some further related embodiment, p is 1 to 18. In some further related embodiment, p is 1 to 16. In some further related embodiment, p is 1 to 14. In some further related embodiment, p is 1 to 12. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1B}$ and $R^{2B}$ may be any of the embodiments described above (e.g. $R^{1B}$ may be linear unsubstituted $C_1$-$C_6$ alkyl, $R^{2B}$ may be linear unsubstituted $C_1$-$C_2$ alkyl).

In formula (X) or (XA) $R^{2B}$ may be independently hydrogen or unsubstituted $C_1$-$C_2$ alkyl. In some embodiments, $R^{2B}$ is hydrogen or unsubstituted $C_1$ or $C_2$ alkyl. In some related embodiments, $R^{2B}$ is hydrogen or branched unsubstituted $C_1$ or $C_2$ saturated alkyl. In some embodiments, $R^{2B}$ is hydrogen or a branched unsubstituted $C_1$ saturated alkyl. In some embodiments, $R^{2B}$ is independently hydrogen or methyl. In other embodiments, $R^{2B}$ is independently hydrogen or ethyl. In some embodiments, $R^{2B}$ is independently hydrogen, methyl or ethyl. In some embodiments, $R^{2B}$ is hydrogen. In some embodiments, $R^{2B}$ is methyl. In some embodiments, $R^{2B}$ is ethyl. In formula (X) $R^{2B}$ can appear more than once and can be optionally different. For example, in some embodiments where n is 3, $R^{2B}$ appears three times and can be optionally different. In other embodiments, where n is 6, $R^{2B}$ appears six times and can be optionally different.

In some embodiments, where multiple $R^{2B}$ substituents are present and at least two $R^{2B}$ substituents are different, $R^{2B}$ substituents with the fewest number of carbons are present to the side of the compound of formula (X) or (XA) bound to the —OH group. In this embodiment, the compound of formula (X) or (XA) will be increasingly hydrophilic in progressing from the $R^{1B}$ substituent to the side of the compound of formula (X) or (XA) bound to the —OH group. The term "side of the compound of formula (X) or (XA) bound to the —OH group" refers to the side of the compound indicated by asterisks in the below structures:

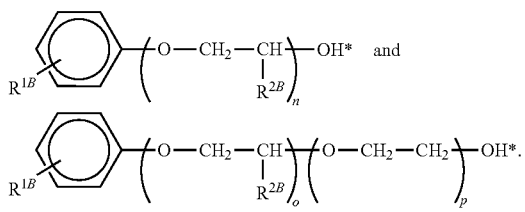

In some embodiments, $R^{2B}$ is hydrogen. In other related embodiments, n is as defined in an embodiment above (e.g. n is at least 1, or at least 20, e.g. 5 to 15). Thus, in some embodiments, $R^{2B}$ is hydrogen and n is 16.

In some embodiments, $R^{2B}$ is methyl. In other related embodiments, n is as defined in an embodiment above (e.g. n is at least 1, or at least 20, e.g. 5 to 15). Thus, in some embodiments, $R^{2B}$ is methyl and n is 16.

In some embodiments, the aqueous composition includes a gas. For instance, the gas may be combined with the aqueous composition to reduce its mobility by decreasing the liquid flow in the pores of the solid material (e.g. rock). In some embodiments, the gas may be supercritical carbon dioxide, nitrogen, natural gas or mixtures of these and other gases.

As described above, the aqueous composition may include the compound of formula (I), (II), or (III) and a co-surfactant. In some embodiments, the aqueous composition includes the compound of formula (I), (II), or (III) and at least one co-surfactant (i.e. more than one). In some further embodiments, the aqueous composition includes the compound of formula (I), (II), or (III) and a first co-surfactant and a second co-surfactant. In some embodiments, the compound is a betaine surfactant (i.e. a compound as described herein for example in formula (I), (II), and (III) or Example 2), wherein $R^1$ is branched unsubstituted $C_{32}$ heteroalkyl, o is 35, p is 15, $L_1$ has the formula

(V)

$L^2$ and $L^4$ are ethylene, $L^3$ is methylene, $R^2$ and $R^4$ are —OH, $R^3$ is —C(O)OH (or C(O)O$^-$), the first co-surfactant is $C_{15}$-$C_{18}$ IOS and the second co-surfactant is C28-45PO-60EO (as described in WO/2012/027757). In other embodiments, the compound is a quaternary ammonium surfactant (i.e. a compound as described herein for example in formula (I), (II), and (III) or Example 1), wherein $R^1$ is branched unsubstituted $C_{32}$ heteroalkyl, o is 35, p is 15, $L_1$ has the formula

(V)

$L^2$, $L^3$ and $L^4$ are ethylene, $R^2$, $R^3$ and $R^4$ are —OH, the first co-surfactant is $C_{15}$-$C_{18}$ IOS and the second co-surfactant is C28-45PO-60EO (as described in WO/2012/027757, formula (VI), (VII), or (VIII)). In one embodiment, the compound is present at about 0.2% w/w. In one embodiment, the first co-surfactant is present at about 0.4% w/w. In some further embodiment, the second-co-surfactant is present at about 0.4% w/w.

In some embodiments, the aqueous composition has a pH of less than about 13.0. In other embodiments, the aqueous composition has a pH of less than about 12. In other embodiments, the aqueous composition has a pH of less than about 11. In other embodiments, the aqueous composition has a pH of less than about 10. In other embodiments, the aqueous composition has a pH of less than about 9.0. In other embodiments, the aqueous composition has a pH of less than about 8.0. In other embodiments, the aqueous composition has a pH of less than about 7.0.

In some embodiments, the aqueous composition has a salinity of at least 10,000 ppm. In other embodiments, the aqueous composition has a salinity of at least 50,000 ppm. In other embodiments, the aqueous composition has a salinity of at least 100,000 ppm. The total range of salinity (total dissolved solids in the brine) is 100 ppm to saturated brine (about 260,000 ppm). The aqueous composition may include seawater, brine or fresh water from an aquifer, river or lake. The aqueous combination may further include salt to increase the salinity. In some embodiments, the salt is NaCl, KCl, $CaCl_2$, $MgCl_2$, $CaSO_4$ or $Na_2CO_3$.

In some embodiments, the temperature of the aqueous composition is at least 40° C. In other embodiments, the temperature of the aqueous composition is at least 100° C. In some embodiments, the aqueous composition has a viscosity of between 20 mPa·s and 100 mPa·s. The viscosity of the aqueous solution may be increased from 0.3 mPa·s to 1, 2, 10, 20, 100 or even 1000 mPa·s by including a water-soluble polymer. As mentioned above, the apparent viscosity of the aqueous composition may be increased with a gas (e.g. a foam forming gas) as an alternative to the water-soluble polymer.

In another aspect, an emulsion composition is provided including an unrefined petroleum phase a compound as described herein (e.g. a compound of formula (I), (II), or (III)). In some embodiments, the emulsion composition includes the components set forth in the aqueous composition provided above. For example, in some embodiments, the emulsion composition further includes a co-surfactant (e.g. wherein the compound and the co-surfactant are present in synergistic surface active amount, a surfactant stabilizing amount, and/or a synergistic solubilizing amount). In some embodiments, the emulsion composition includes a co-surfactant and a co-solvent. The emulsion composition may include a combination of one or more co-surfactants and one or more co-solvents. In some embodiments, the viscosity of the emulsion composition is less than the viscosity in the absence of the compound. In some embodiments, the viscosity of the emulsion composition is less than 3 times the viscosity of an unrefined petroleum (e.g. the unrefined petroleum which makes up the unrefined petroleum phase of the emulsion composition). In other embodiments, the viscosity of the emulsion composition is less than 30 mPa s. In other embodiments, the viscosity of the emulsion composition is less than 200 mPa s. In other embodiments, the interfacial tension of the emulsion composition is less than the interfacial tension in the absence of the compound.

In some embodiments, the emulsion composition is a microemulsion. A "microemulsion" as referred to herein is a thermodynamically stable mixture of oil, water and surfactants that may also include additional components such as co-solvents, electrolytes, alkali and polymers. In contrast, a "macroemulsion" as referred to herein is a thermodynamically unstable mixture of oil and water that may also include additional components. The emulsion composition provided herein may be an oil-in-water emulsion, wherein the surfactant forms aggregates (e.g. micelles) where the hydrophilic part of the surfactant molecule contacts the aqueous phase of the emulsion and the lipophilic part contacts the oil phase of the emulsion. Thus, in some embodiments, the surfactant forms part of the aqueous part of the emulsion. And in other embodiments, the surfactant forms part of the oil phase of the emulsion. In yet another embodiment, the surfactant forms part of an interface between the aqueous phase and the oil phase of the emulsion.

In other embodiments, the oil and water solubilization ratios are insensitive to the combined concentration of divalent metal cations (e.g. $Ca^{+2}$ and $Mg^{+2}$) within the aqueous phase. In other embodiments, the oil and water solubilization ratios are insensitive to the salinity of the water or to all of the specific electrolytes contained in the water. The term "insensitive" used in the context of this paragraph means that the solubilization ratio tends not to change (e.g. tends to remain constant) as the concentration of divalent metal cations and/or salinity of water changes. In some embodiments, the change in the solubilization ratios are less than 5%, 10%, 20%, 30%, 40%, or 50% over a divalent metal cation concentration range of 10 ppm, 100 ppm, 1000 ppm or 10,000 ppm. In another embodiment, the change in the solubilization ratios are less than 5%, 10%, 20%, 30%, 40%, or 50% over a salinity concentration range of 10 ppm, 100 ppm, 1000 ppm or 10,000 ppm.

III. Methods

In another aspect, a method of displacing a hydrocarbon material in contact with a solid material is provided. The method includes contacting a hydrocarbon material with the compound described herein (e.g. a compound of formula (I), (II), or (III)), wherein the hydrocarbon material is in contact with a solid material. The hydrocarbon material is allowed to separate from the solid material thereby displacing the hydrocarbon material in contact with the solid material. The hydrocarbon material is allowed to separate from the solid material thereby displacing the hydrocarbon material in contact with the solid material. In some embodiments, the solid material is contacted with the compound. A "hydrocarbon material," as provided herein, is a hydrophobic material containing alkyl chains. The compound may be present in an aqueous composition or an emulsion composition as described above.

In other embodiments, the hydrocarbon material is unrefined petroleum (e.g. in a petroleum reservoir). The solid material may be a natural solid material (i.e. a solid found in nature such as rock). The natural solid material may be found in a petroleum reservoir. In some embodiments, the method is an enhanced oil recovery method. Enhanced oil recovery methods are well known in the art. A general treatise on enhanced oil recovery methods is *Basic Concepts in Enhanced Oil Recovery Processes* edited by M. Baviere (published for SCI by Elsevier Applied Science, London and New York, 1991). For example, in an enhanced oil recovery method, the displacing of the unrefined petroleum in contact with the solid material is accomplished by contacting the unrefined with a compound provided herein (e.g. a compound of formula (I), (II) or (III)), wherein the unrefined petroleum is in contact with the solid material. The unrefined petroleum may be in an oil reservoir. The compound provided herein (e.g. a compound of formula (I), (II), or (III)) is pumped into the reservoir in accordance with known enhanced oil recovery parameters. The compound may be pumped into the reservoir as part of the aqueous compositions provided herein and, upon contacting the unrefined petroleum, form an emulsion composition provided herein.

In some embodiments, the compound is present in an in amount sufficient to increase the water wettability of the solid material relative to the absence of the compound. The term "water wettability" as provided herein refers to the ability of a surface of being spreadable with water. In some embodiments, the natural solid material is rock or regolith. The natural solid material may be a geological formation such as clastics or carbonates. The natural solid material may be either consolidated or unconsolidated material or mixtures thereof. The hydrocarbon material may be trapped or confined by "bedrock" above or below the natural solid material. The hydrocarbon material may be found in fractured bedrock or porous natural solid material. In other embodiments, the regolith is soil. In some embodiments, the compound forms part of an aqueous composition comprising one or more co-surfactants and the hydrocarbon material is an unrefined petroleum material.

In some embodiments, an emulsion forms after the contacting. The emulsion thus formed may be the emulsion composition as described above. In some embodiments, the method includes allowing an unrefined petroleum acid within the unrefined petroleum material to enter into the emulsion (e.g. emulsion composition), thereby converting the unrefined petroleum acid into a surfactant. In other words, where the unrefined petroleum acid converts into a surfactant it is mobilized and therefore separates from the solid material.

In another aspect, a method of converting an unrefined petroleum acid into a surfactant is provided. The method includes contacting a petroleum material with an aqueous composition thereby forming an emulsion in contact with the petroleum material, wherein the aqueous composition includes the compound described herein (e.g. a compound of formula (I), (II), or (III)) and a co-surfactant. The aqueous composition may further include a co-surfactant. Thus, in some embodiments, the aqueous composition is the aqueous composition described above. And in some embodiments, the emulsion is the emulsion composition described above. An unrefined petroleum acid within said unrefined petroleum material is allowed to enter into the emulsion, thereby converting the unrefined petroleum acid into a surfactant. In some embodiments, the reactive petroleum material is in a petroleum reservoir. In some embodiments, as described above and as is generally known in the art, the unrefined petroleum acid is a naphthenic acid. In some embodiments, as described above and as is generally known in the art, the unrefined petroleum acid is a mixture of naphthenic acid.

IV. Examples

Example 1

Schematic of synthesis of quaternary ammonium surfactant compound.

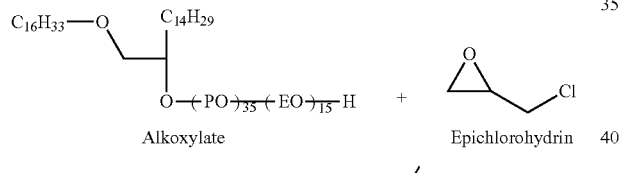

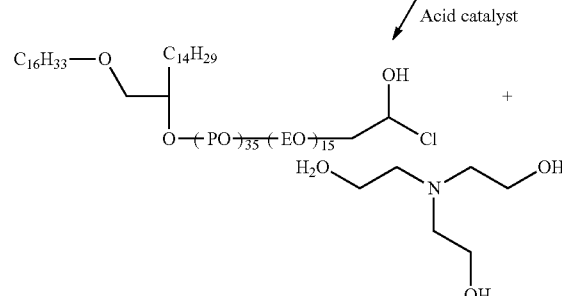

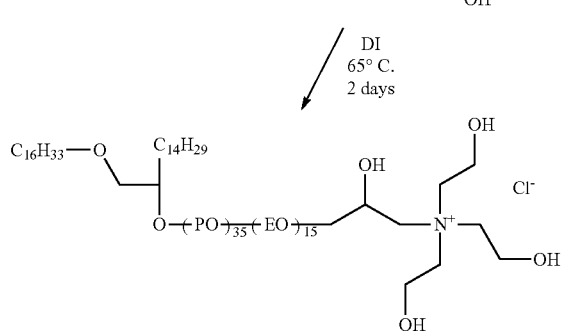

Example 2

Schematic of synthesis of betaine surfactant compound.

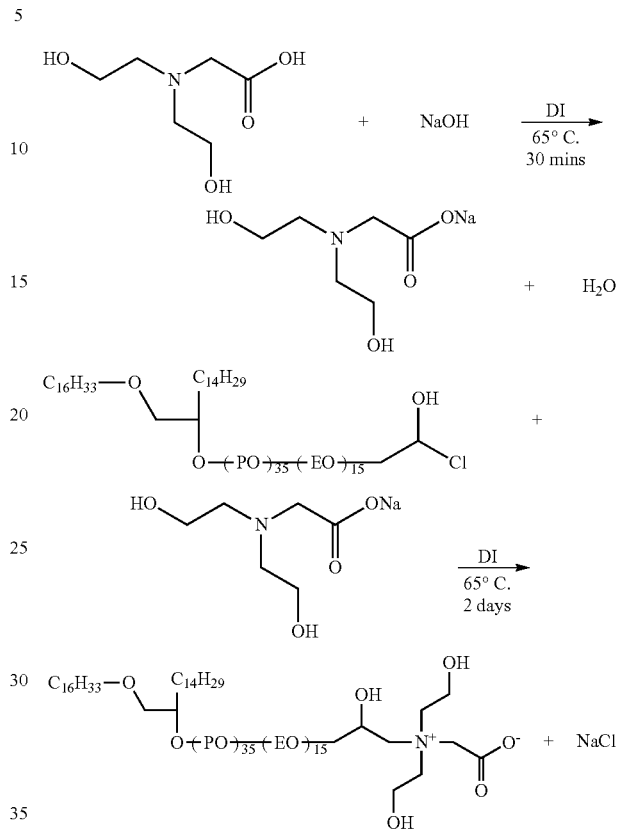

V. Tables

TABLE 1

Figure 2:
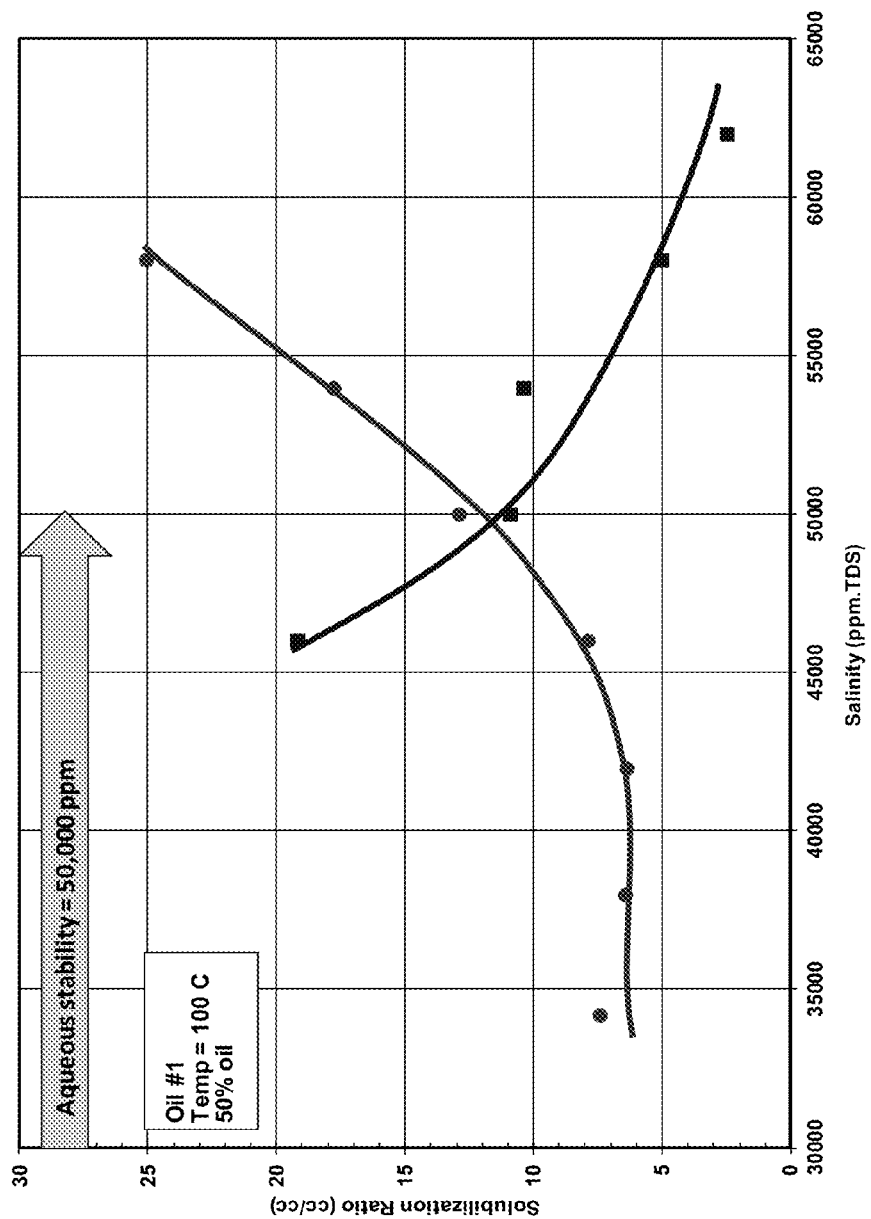
FIG. 2. Solubilization ratios using the surfactant formulation 0.4% C28-45PO-60EO Carboxylate, 0.4% C15-18 IOS, 0.2% Quaternary Ammonium Surfactant with Oil #1 (50%) at 100° C. The black arrow in the histogram pointing from left to right indicates the aqueous stability at 50,000 ppm (TDS).
Figure 3:
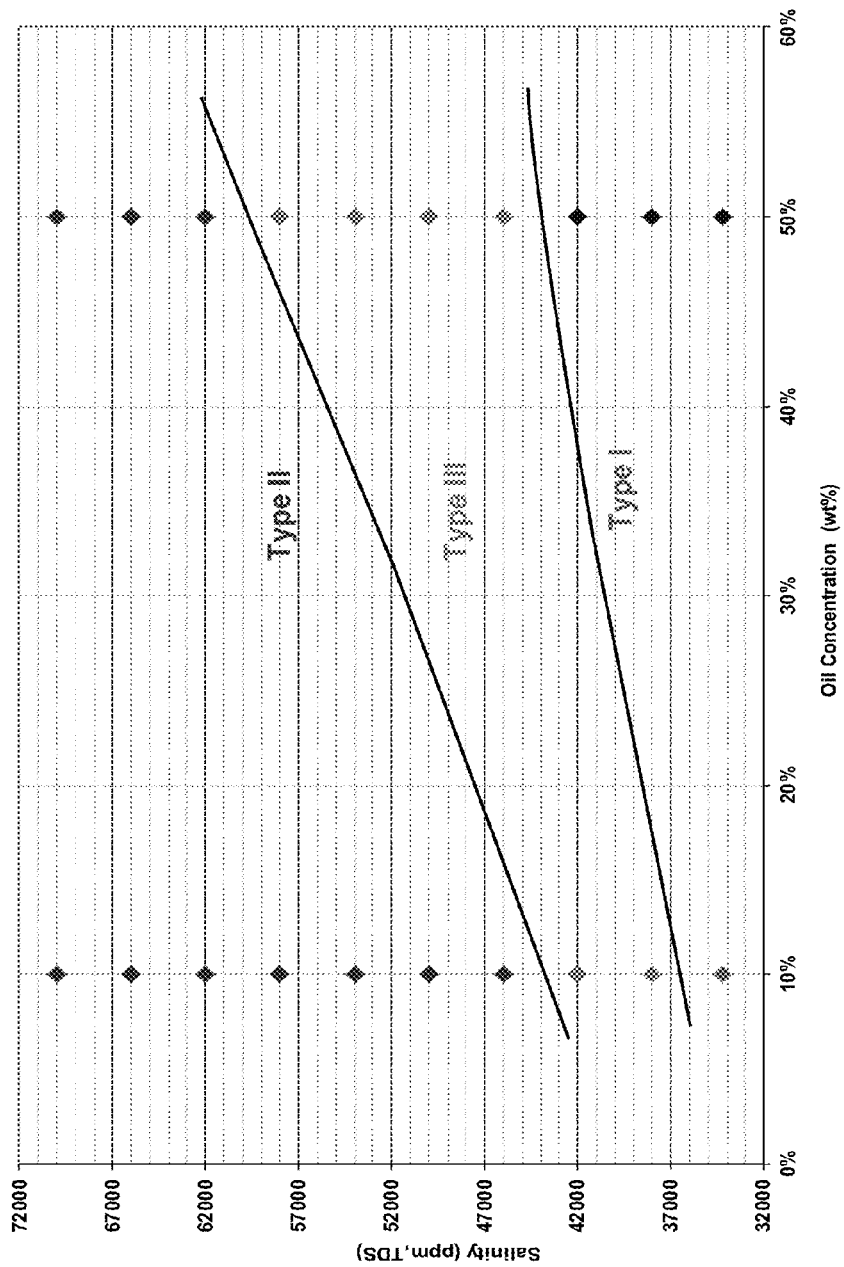
FIG. 3. Activity map for active Oil #1 using formulation 0.4% C28-45PO-60EO Carboxylate, 0.4% C15-18 IOS, 0.2% Quaternary Ammonium Surfactant with Oil #1 at 100° C.
Figure 4:
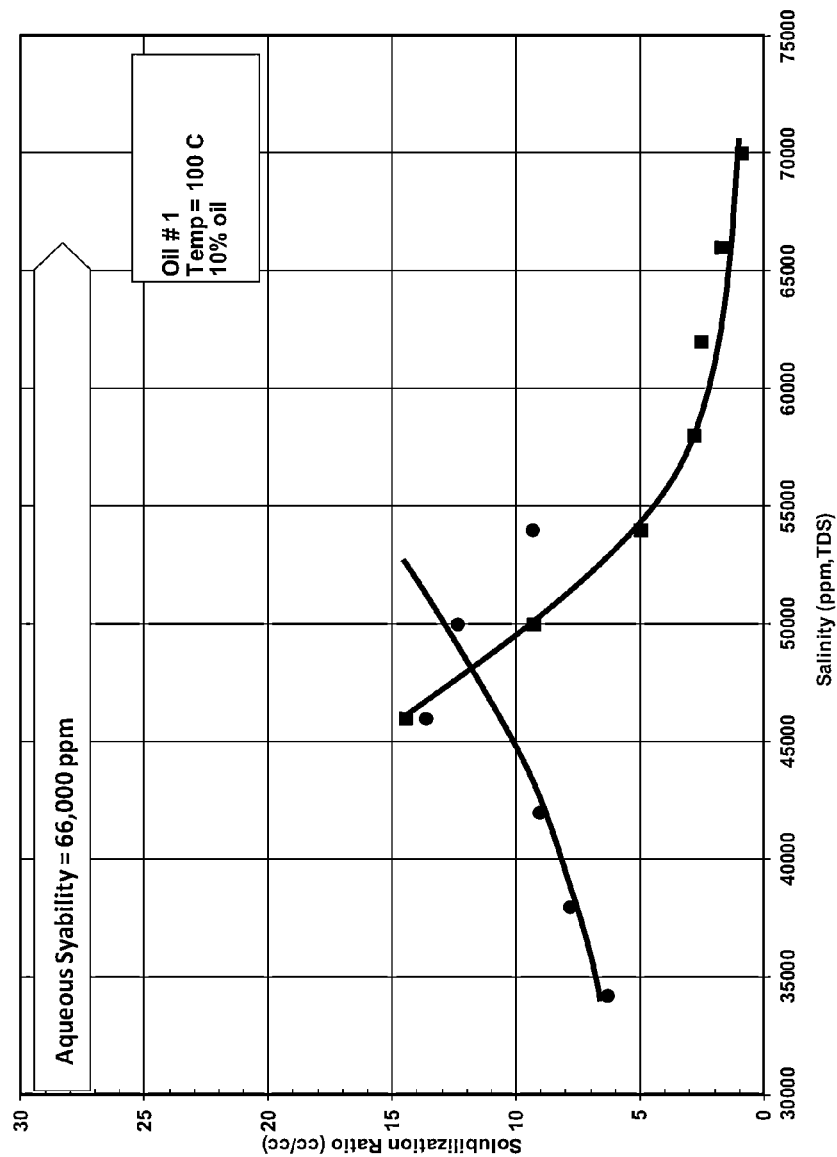
FIG. 4. Solubilization ratios using the surfactant formulation 0.4% C28-45PO-60EO Carboxylate, 0.4% C15-18 IOS, 0.2% Betaine Surfactant with Oil #1 (10%) at 100° C. The black arrow in the histogram pointing from left to right indicates the aqueous stability at 66,000 ppm (TDS).
Figure 5:
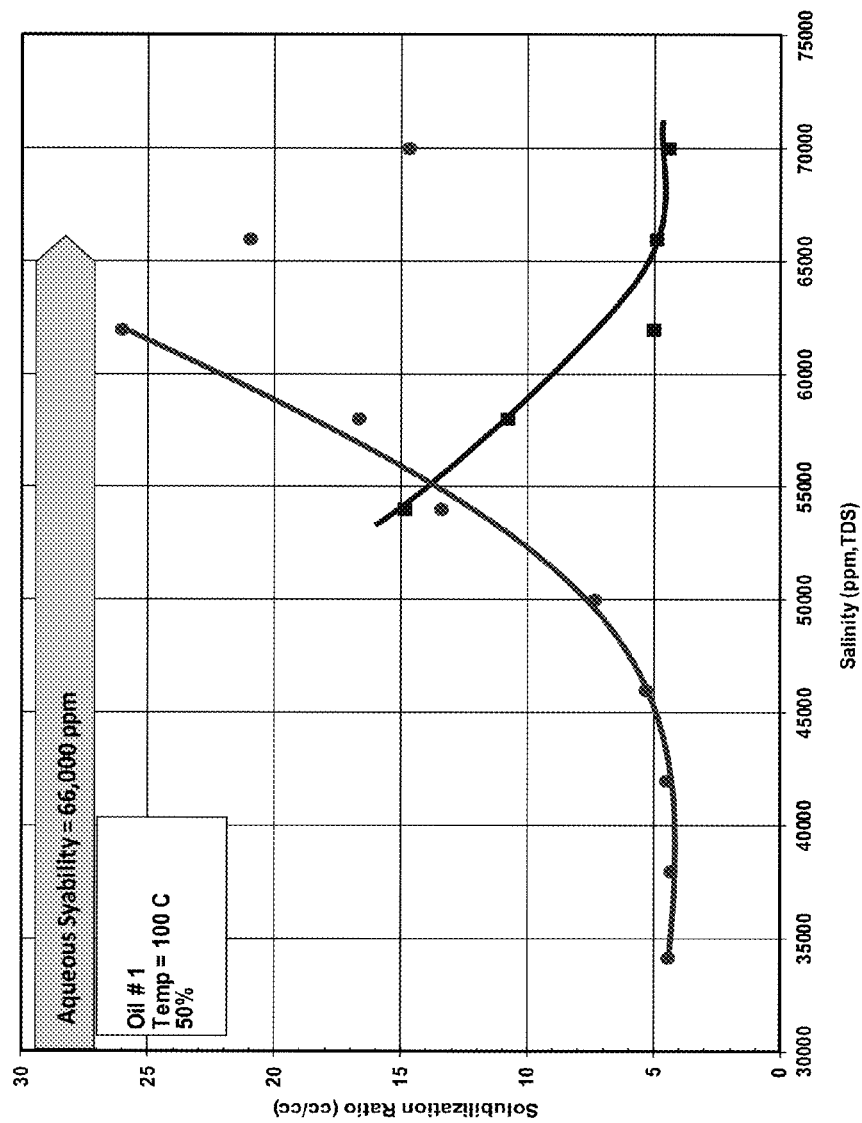
FIG. 5. Solubilization ratios using the surfactant formulation 0.4% C28-45PO-60EO Carboxylate, 0.4% C15-18 IOS, 0.2% Betaine Surfactant with Oil #1 (50%) at 100° C. The black arrow in the histogram pointing from left to right indicates the aqueous stability at 66,000 ppm (TDS).
Figure 6:
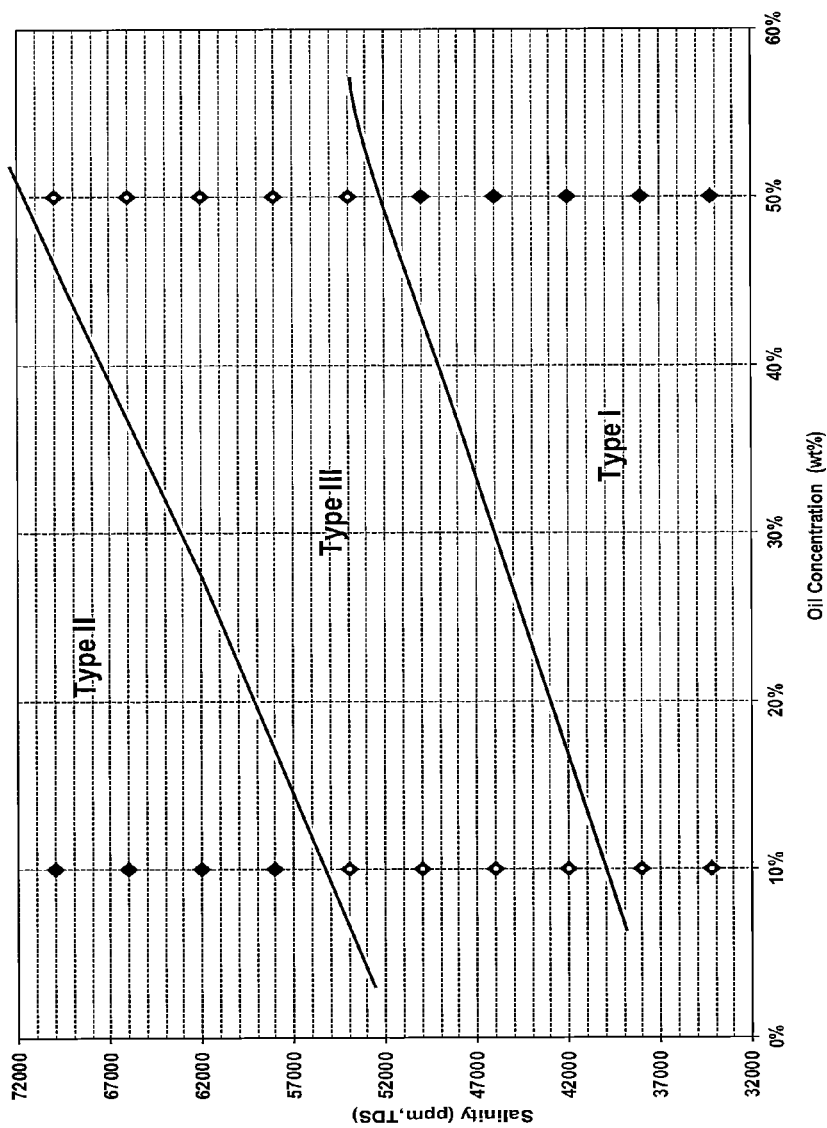
FIG. 6. Activity map for active Oil #1 using formulation 0.4% C28-45PO-60EO Carboxylate, 0.4% C15-18 IOS, 0.2% Betaine Surfactant with Oil #1 at 100° C.

Features of Oil #1 used for examples disclosed in FIGS. 1 to 6.

| Crude Oil | °API Gravity | Viscosity |
|---|---|---|
| Oil #1 (diluted with 30% Cyclohexane) | 22 | 2.1 cP at 100° C. |

TABLE 2

Composition of brine used for examples disclosed in FIGS. 1 to 6.

| Brine Composition | Formation Brine | Synthetic Sea Water |
|---|---|---|
| $Na^+$ (ppm) | 41,473 | 12,188 |
| $Ca^{2+}$ (ppm) | 3,880 | 480 |
| $Mg^{2+}$ (ppm) | 145 | 1,342 |
| $Cl^-$ (ppm) | 70,971 | 21,133 |
| $SO_4^{2-}$ (ppm) | 500 | 3,250 |
| TDS (ppm) | 116,969 | 38,393 |

VI. Embodiments

Embodiment 1. A compound having the formula:

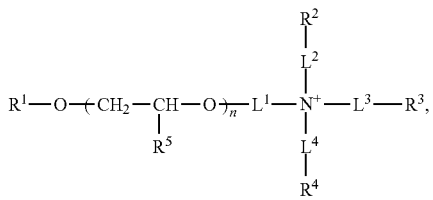

Wherein $R^1$ is $R^{12}$-substituted or unsubstituted $C_8$-$C_{150}$ alkyl, $R^6$-substituted or unsubstituted heteroalkyl, $R^6$-substituted or unsubstituted aryl or $R^6$-substituted or unsubstituted cycloalkyl; $R^6$ is $R^7$-substituted or unsubstituted $C_1$-$C_{50}$ alkyl, $R^7$-substituted or unsubstituted heteroalkyl, $R^7$-substituted or unsubstituted aryl or $R^7$-substituted or unsubstituted cycloalkyl; $R^7$ is $R^8$-substituted or unsubstituted $C_1$-$C_{50}$ alkyl, $R^8$-substituted or unsubstituted heteroalkyl, $R^8$-substituted or unsubstituted aryl or $R^8$-substituted or unsubstituted cycloalkyl; $R^8$ is $R^9$-substituted or unsubstituted $C_1$-$C_{50}$ alkyl, $R^9$-substituted or unsubstituted heteroalkyl, $R^9$-substituted or unsubstituted aryl or $R^9$-substituted or unsubstituted cycloalkyl; $R^9$ is $R^{10}$-substituted or unsubstituted $C_1$-$C_{50}$ alkyl, $R^{10}$-substituted or unsubstituted heteroalkyl, $R^{10}$-substituted or unsubstituted heteroalkyl, $R^{10}$-substituted or unsubstituted aryl or $R^{10}$-substituted or unsubstituted cycloalkyl; $R^{10}$ is $R^{11}$-substituted or unsubstituted $C_1$-$C_{50}$ alkyl, $R^{11}$-substituted or unsubstituted heteroalkyl, $R^{11}$-substituted or unsubstituted aryl or $R^{11}$-substituted or unsubstituted cycloalkyl; $R^{11}$ is unsubstituted $C_1$-$C_{50}$ alkyl, unsubstituted heteroalkyl, unsubstituted aryl or cycloalkyl; $R^{12}$ is unsubstituted heteroalkyl, unsubstituted aryl or unsubstituted cycloalkyl; $R^2$, $R^3$, and $R^4$ are independently unsubstituted alkyl, unsubstituted cycloalkyl, unsubstituted aryl, $-OR^{13}$, $-C(O)OR^{13}$, or $-S(O)_mR^{13}$; $R^{13}$ is hydrogen, unsubstituted alkyl or unsubstituted cycloalkyl; m is 3 or 4; $R^5$ is independently hydrogen or unsubstituted $C_1$-$C_6$ alkyl; $L^1$, $L^2$, $L^3$, and $L^4$ are independently a bond, substituted or unsubstituted alkylene, substituted or unsubstituted heteroalkylene, substituted or unsubstituted cycloalkylene, or substituted or unsubstituted arylene; and n is an integer from 10 to 210.

Embodiment 2. The compound of embodiment 1, wherein $R^1$ is branched or linear unsubstituted $C_{10}$-$C_{100}$ alkyl, $R^6$-substituted or unsubstituted $C_{10}$-$C_{100}$ heteroalkyl, or $R^6$-substituted phenyl.

Embodiment 3. The compound of embodiments 1 or 2, wherein $R^1$ is branched unsubstituted $C_{10}$-$C_{50}$ alkyl, branched unsubstituted $C_{10}$-$C_{50}$ heteroalkyl, $(C_6H_5-CH_2CH_2)_3C_6H_2-$, $(C_6H_5-CH_2CH_2)_2C_6H_3-$, $(C_6H_5-CH_2CH_2)_1C_6H_4-$, or $R^6$-substituted or unsubstituted naphthyl.

Embodiment 4. The compound of any one of embodiments 1-3, wherein $R^1$ is branched unsubstituted $C_{16}$-$C_{40}$ heteroalkyl.

Embodiment 5. The compound of any one of embodiments 1-4, wherein $L^1$ is substituted $C_1$-$C_5$ alkylene.

Embodiment 6. The compound of any one of embodiments 1-5, wherein $L^1$ is substituted propylene.

Embodiment 7. The compound of any one of embodiments 1-6, wherein $L^1$ is having the structure:

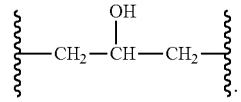

Embodiment 8. The compound of any one of embodiments 1-7, wherein $R^2$, $R^3$, and $R^4$ are independently $-OR^{13}$ or $-C(O)OR^{13}$.

Embodiment 9. The compound of any one of embodiments 1-8, wherein $R^{13}$ is hydrogen.

Embodiment 10. The compound of any one of embodiments 1-6, wherein $R^2$, $R^3$, and $R^4$ are $-OH$ and $L^2$, $L^3$, and $L^4$ are unsubstituted $C_1$-$C_4$ alkylene.

Embodiment 11. The compound of any one of embodiments 1-6, wherein $L^2$, $L^3$, and $L^4$ are ethylene.

Embodiment 12. The compound of any one of embodiments 1-11, wherein $R^2$ and $R^4$ are independently $-OR^{13}$ and $R^3$ is $-C(O)OR^{13}$.

Embodiment 13. The compound of embodiment 8, wherein $R^{13}$ is hydrogen and $L^2$, $L^3$, and $L^4$ are unsubstituted $C_1$-$C_4$ alkylene.

Embodiment 14. The compound of embodiment 1, wherein $R^2$ and $R^4$ are independently $-OR^{13}$ and $R^3$ is $-S(O)_3R^{13}$.

Embodiment 15. The compound of embodiment 10, wherein $R^{13}$ is hydrogen and $L^2$, $L^3$, and $L^4$ are independently unsubstituted $C_1$-$C_4$ alkylene.

Embodiment 16. The compound of any one of embodiments 1-15, wherein $R^5$ is independently hydrogen or unsubstituted $C_1$-$C_2$ alkyl.

Embodiment 17. The compound of any one of embodiments 1-16, wherein n is 5 to 100.

Embodiment 18. The compound of embodiment 1 having the formula:

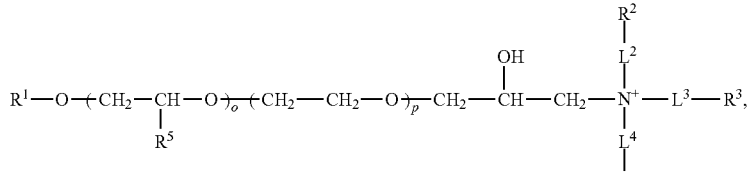

wherein o is an integer from 20 to 100; p is an integer from 10 to 80; and $R^5$ is unsubstituted $C_1$-$C_3$ alkyl.

Embodiment 19. The compound of embodiment 13, wherein $R^5$ is methyl.

Embodiment 20. The compound of embodiments 18 or 19, wherein $R^1$ is branched $C_{15}$-$C_{40}$ heteroalkyl, o is 35 to 50 and p is 15 to 65.

Embodiment 21. The compound of embodiment 1 having the formula:

$$R^1-O-(CH_2-CH-O)_q-(CH_2-CH-O)_o-(CH_2-CH_2-O)_p-CH_2-CH-CH_2-N^+-L^3-R^3,$$
$$\quad\quad\quad\quad\quad\quad\quad R^5 \quad\quad\quad\quad CH_3 \quad\quad\quad\quad\quad\quad\quad\quad OH \quad\quad R^2,L^4-R^4,L^2$$

wherein p is an integer from 10 to 100; o is an integer from 20 to 80; q is an integer from 0 to 60; and $R^5$ is unsubstituted $C_1$-$C_3$ alkyl.

Embodiment 22. The compound of embodiment 21, wherein $R^5$ is ethyl.

Embodiment 23. An aqueous composition comprising a co-surfactant and the compound of one of embodiments 1 to 22.

Embodiment 24. The aqueous composition of embodiment 23, wherein said co-surfactant is an anionic surfactant, a non-ionic surfactant, or a cationic surfactant.

Embodiment 25. The aqueous composition of embodiments 23 or 24, wherein said co-surfactant is an internal olefin sulfonate (IOS), an alfa olefin sulfonate (AOS), an alkyl aryl sulfonate (ARS), an alkane sulfonate, a petroleum sulfonate, an alkyl diphenyl oxide (di)sulfonate, an alcohol sulfate, an alkoxy sulfate, an alkoxy sulfonate, an alcohol phosphate, an alkoxy phosphate, a sulfosuccinate ester, an alcohol ethoxylate, an alkyl phenol ethoxylate, a betaine or sultaine.

Embodiment 26. The aqueous composition of any one of embodiments 23-25, wherein said co-surfactant is a $C_{10}$-$C_{30}$ internal olefin sulfate (IOS).

Embodiment 27. The aqueous composition of any one of embodiments 23-26, further comprising a co-solvent.

Embodiment 28. The aqueous composition of any one of embodiments 23-27, further comprising an alkali agent.

Embodiment 29. The composition of any one of embodiments 23-28, wherein said alkali agent is NaOH, KOH, LiOH, $Na_2CO_3$, $NaHCO_3$, Na-metaborate, Na silicate, Na orthosilicate, or $NH_4OH$.

Embodiment 30. The aqueous composition of any one of embodiments 23-29, further comprising a gas.

Embodiment 31. The aqueous composition of any one of embodiments 23-30, wherein the temperature of said aqueous composition is approximately about 100° C.

Embodiment 32. The aqueous composition of any one of embodiments 23-31, having a salinity of at least 10,000 ppm.

Embodiment 33. The aqueous composition of any one of embodiments 23-32, having a salinity of at least 50,000 ppm.

Embodiment 34. The aqueous composition of any one of embodiments 23-33, having a salinity of at least 100,000 ppm.

Embodiment 35. The aqueous composition of any one of embodiments 23-34, wherein said compound is present at an amount of approximately 0.2% w/w.

Embodiment 36. An emulsion composition comprising an unrefined petroleum phase and the compound of one of embodiments 1 to 22.

Embodiment 37. The emulsion composition of embodiment 36, further comprising a co-surfactant.

Embodiment 38. The emulsion composition of embodiments 36 or 37, wherein the viscosity of the emulsion composition is less than the viscosity in the absence of the compound.

Embodiment 39. The emulsion composition of any one of embodiments 36-38, wherein the interfacial tension of the emulsion composition is less than the interfacial tension in the absence of the compound.

Embodiment 40. The emulsion composition of any one of embodiments 36-39, wherein the emulsion composition is a microemulsion.

Embodiment 41. A method of displacing a hydrocarbon material in contact with a solid material, said method comprising:
(i) contacting a hydrocarbon material with the compound of one of embodiments 1 to 22, wherein said hydrocarbon material is in contact with a solid material;
(ii) allowing said hydrocarbon material to separate from said solid material thereby displacing said hydrocarbon material in contact with said solid material.

Embodiment 42. The method of embodiment 41, further comprising contacting the solid material with the compound.

Embodiment 43. The method of embodiments 41 or 42, wherein said compound is present in an amount sufficient to increase the water wettability of said solid material relative to the absence of said compound.

Embodiment 44. The method of any one of embodiments 41-43, wherein said hydrocarbon material is unrefined petroleum in a petroleum reservoir and said solid material is a natural solid material in a petroleum reservoir.

Embodiment 45. The method of any one of embodiments 41-44, wherein said method is an enhanced oil recovery method.

Embodiment 46. The method of any one of embodiments 41-45, wherein said solid material is rock or regolith.

Embodiment 47. The method of embodiment 46, wherein said regolith is soil.

Embodiment 48. The method of any one of embodiments 41-47, wherein said compound forms part of an aqueous composition comprising a co-surfactant and said hydrocarbon material is an unrefined petroleum material.

Embodiment 49. The method of any one of embodiments 41-48, wherein an emulsion forms after said contacting.

Embodiment 50. The method of any one of embodiments 41-49, wherein said method further comprises allowing an unrefined petroleum acid within said unrefined petroleum material to enter into said emulsion, thereby converting said unrefined petroleum acid into a surfactant.

Embodiment 51. A method of converting an unrefined petroleum acid into a surfactant, said method comprising:
(i) contacting a petroleum material with an aqueous composition thereby forming an emulsion in contact with said petroleum material, wherein said aqueous composition comprises the compound of one of embodiments 1 to 22 and a co-surfactant;
(ii) allowing an unrefined petroleum acid within said unrefined petroleum material to enter into said emulsion, thereby converting said unrefined petroleum acid into a surfactant.

Embodiment 52. The method of embodiment 51, wherein said reactive petroleum material is in a petroleum reservoir.

What is claimed is:

1. A compound having the formula:

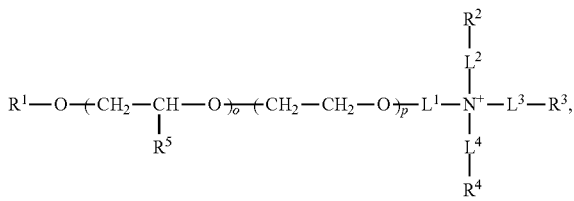

wherein
- $R^1$ is $R^{12}$-substituted or unsubstituted $C_8$-$C_{150}$ alkyl, $R^6$-substituted or unsubstituted heteroalkyl, $R^6$-substituted or unsubstituted aryl or $R^6$-substituted or unsubstituted cycloalkyl;
- $R^6$ is $R^7$-substituted or unsubstituted $C_1$-$C_{50}$ alkyl, $R^7$-substituted or unsubstituted heteroalkyl, $R^7$-substituted or unsubstituted aryl or $R^7$-substituted or unsubstituted cycloalkyl;
- $R^7$ is $R^8$-substituted or unsubstituted $C_1$-$C_{50}$ alkyl, $R^8$-substituted or unsubstituted heteroalkyl, $R^8$-substituted or unsubstituted aryl or $R^8$-substituted or unsubstituted cycloalkyl;
- $R^8$ is $R^9$-substituted or unsubstituted $C_1$-$C_{50}$ alkyl, $R^9$-substituted or unsubstituted heteroalkyl, $R^9$-substituted or unsubstituted aryl or $R^9$-substituted or unsubstituted cycloalkyl;
- $R^9$ is $R^{10}$-substituted or unsubstituted $C_1$-$C_{50}$ alkyl, $R^{10}$-substituted or unsubstituted heteroalkyl, $R^{10}$-substituted or unsubstituted aryl or $R^{10}$-substituted or unsubstituted cycloalkyl;
- $R^{10}$ is $R^{11}$-substituted or unsubstituted $C_1$-$C_{50}$ alkyl, $R^{11}$-substituted or unsubstituted heteroalkyl, $R^{11}$-substituted or unsubstituted aryl or $R^{11}$-substituted or unsubstituted cycloalkyl;
- $R^{11}$ is unsubstituted $C_1$-$C_{50}$ alkyl, unsubstituted heteroalkyl, unsubstituted aryl or unsubstituted cycloalkyl;
- $R^{12}$ is unsubstituted heteroalkyl, unsubstituted aryl or unsubstituted cycloalkyl;
- $R^2$, $R^3$, and $R^4$ are independently unsubstituted alkyl, unsubstituted cycloalkyl, unsubstituted aryl, $-OR^{13}$, $-C(O)OR^{13}$, or $-S(O)_mR^{13}$;
- $R^{13}$ is hydrogen, unsubstituted alkyl or unsubstituted cycloalkyl;
- m is 3 or 4;
- $R^5$ is independently for each occurrence unsubstituted $C_1$-$C_3$ alkyl;
- $L^1$, $L^2$, $L^3$, and $L^4$ are independently a bond, substituted or unsubstituted alkylene, substituted or unsubstituted heteroalkylene, substituted or unsubstituted cycloalkylene, or substituted or unsubstituted arylene;
- o is an integer from 10 to 100; and
- p is an integer from 5 to 80.

2. The compound of claim 1, wherein $R^1$ is branched unsubstituted $C_{16}$-$C_{40}$ heteroalkyl.

3. The compound of claim 1, wherein $R^2$, $R^3$, and $R^4$ are independently $-OR^{13}$ or $-C(O)OR^{13}$.

4. The compound of claim 3, wherein $R^{13}$ is hydrogen.

5. The compound of claim 4, wherein $R^2$, $R^3$, and $R^4$ are $-OH$ and $L^2$, $L^3$, and $L^4$ are unsubstituted $C_1$-$C_4$ alkylene.

6. The compound of claim 5, wherein $L^2$, $L^3$, and $L^4$ are ethylene.

7. The compound of claim 1, wherein $R^2$ and $R^4$ are independently $-OR^{13}$ and $R^3$ is $-C(O)OR^{13}$.

8. The compound of claim 7, wherein $R^{13}$ is hydrogen and $L^2$, $L^3$, and $L^4$ are unsubstituted $C_1$-$C_4$ alkylene.

9. The compound of claim 1, wherein $R^2$ and $R^4$ are independently $-OR^{13}$ and $R^3$ is $-S(O)_3R^{13}$.

10. The compound of claim 1, wherein $R^5$ is independently for each occurrence unsubstituted $C_1$-$C_2$ alkyl.

11. The compound of claim 1, having the formula:

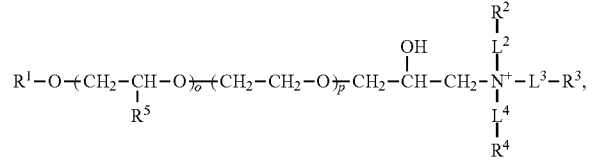

wherein
- o is an integer from 20 to 100; and
- p is an integer from 10 to 80.

12. An aqueous composition comprising a co-surfactant and the compound of claim 1.

13. The aqueous composition of claim 12, wherein said co-surfactant is an anionic surfactant, a non-ionic surfactant, or a cationic surfactant.

14. The aqueous composition of claim 12, further comprising a co-solvent.

15. The aqueous composition of claim 12, further comprising an alkali agent.

16. The aqueous composition of claim 12, further comprising a gas.

17. The compound of claim 1, wherein o is greater than p.

* * * * *